US009857664B1

(12) United States Patent
Tang et al.

(10) Patent No.: US 9,857,664 B1
(45) Date of Patent: Jan. 2, 2018

(54) COLLAPSIBLE PHOTO ENCLOSURE AND COMPONENTS

(71) Applicant: Amazon Technologies, Inc., Seattle, WA (US)

(72) Inventors: David Tang, Santa Clara, CA (US); John Larkin, Santa Clara, CA (US); Isabella Talley Lewis, San Jose, CA (US); Cameron Bo Logsdon, Cincinnati, OH (US); Michael Paul Nelson, Seattle, WA (US); Gregory James Nyssen, Seattle, WA (US); Guruprasad Ramanathan, Los Altos, CA (US); Srivatsan Subbarayan, Sunnyvale, CA (US); Robi Thomas, Mountain House, CA (US); William Franklin Troutman, Jr., Livermoure, CA (US); Bradley David Urban, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/266,661

(22) Filed: Sep. 15, 2016

(51) Int. Cl.
| | |
|---|---|
| *G03B 15/02* | (2006.01) |
| *G03B 15/06* | (2006.01) |
| *F21V 29/70* | (2015.01) |
| *F21V 29/508* | (2015.01) |
| *F21V 23/04* | (2006.01) |
| *F21Y 115/10* | (2016.01) |

(52) U.S. Cl.
CPC .......... *G03B 15/06* (2013.01); *F21V 23/0414* (2013.01); *F21V 29/508* (2015.01); *F21V 29/70* (2015.01); *F21Y 2115/10* (2016.08)

(58) Field of Classification Search
USPC ................................ 396/2, 4, 681; 362/3, 11
See application file for complete search history.

(56) References Cited

U.S. PATENT DOCUMENTS

| | | | | |
|---|---|---|---|---|
| 1,754,663 A | * | 4/1930 | Adams ..................... | A45C 3/02 190/115 |
| 4,490,776 A | | 12/1984 | Kluch | |
| 5,313,373 A | * | 5/1994 | Bjorner ..................... | B07C 3/14 362/17 |

(Continued)

OTHER PUBLICATIONS

Office Action for U.S. Appl. No. 14/712,284, dated Feb. 23, 2016, Nyssen et al., "Collapsible Photo Enclosure", 25 pages.

(Continued)

*Primary Examiner* — Clayton E LaBalle
*Assistant Examiner* — Warren K Fenwick
(74) *Attorney, Agent, or Firm* — Lee & Hayes, PLLC

(57) ABSTRACT

An example enclosure includes a base, a plurality of walls extending from the base, and a top disposed opposite the base and connected to at least one of the plurality of walls. The enclosure also includes a light assembly configured to illuminate an interior space of the enclosure. The light assembly includes a diffuser, a heat sink connected to the diffuser, a substrate connected to the heat sink, and a light source connected to the substrate. The diffuser may be connected to one of the top or the base such that the heat sink is spaced from the one of the top or the base. Additionally, the top is moveable toward the base to transition the enclosure from an expanded state to a collapsed state.

20 Claims, 13 Drawing Sheets

(56) References Cited

U.S. PATENT DOCUMENTS

| | | | | |
|---|---|---|---|---|
| 5,764,874 A * | 6/1998 | White | ................ | G01N 21/8806 355/67 |
| 6,441,943 B1 * | 8/2002 | Roberts | ................ | B60Q 1/2665 250/214 AL |
| 7,055,976 B2 * | 6/2006 | Blanford | ................ | G03B 15/06 229/103 |
| 7,396,148 B1 * | 7/2008 | Tsai | ...................... | G03B 15/03 362/17 |
| 7,431,172 B1 * | 10/2008 | Spindel | .............. | B65D 11/1853 217/15 |
| 7,680,401 B1 * | 3/2010 | Adelstein | ................ | A45C 9/00 396/1 |
| 9,442,347 B1 * | 9/2016 | Nyssen | .................. | G03B 15/07 |
| 2008/0101086 A1 * | 5/2008 | Lee | ................... | G02F 1/133605 362/615 |
| 2014/0225514 A1 * | 8/2014 | Pickard | .............. | H05B 33/0857 315/152 |
| 2014/0232289 A1 * | 8/2014 | Brandes | ............... | H05B 33/086 315/250 |
| 2015/0370146 A1 * | 12/2015 | Johnson | ................ | G03B 15/07 396/4 |

OTHER PUBLICATIONS

Office Action for U.S. Appl. No. 14/712,284, dated Sep. 24, 2015, Nyssen et al., "Collapsible Photo Enclosure", 21 pages.
Shotbox Pop-Up Photo Light Studio, retrived from https://www.kickstarter.com/projects/695573783/shotbox-tabletop-photo-light-studio on Sep. 4, 2015, 5 pages.
SOOC Studio, retrieved from http://whitebison.co.za/products/sooc-studio on Sep. 4, 2015, 5 pages.

* cited by examiner

COLLAPSIBLE PHOTO ENCLOSURE AND COMPONENTS

BACKGROUND

The Internet has evolved as a useful tool for the exchange of goods, and various online marketplaces or other websites now enable users to list items for sale with relative ease. As part of this process, a user may capture an image of the item he or she wishes to sell, and may upload the image to the respective website when generating a listing on the website. The operators of such websites generally have relatively strict image quality requirements that must be satisfied before the image may be uploaded. For example, website operators typically require that the image of the item is free from shadows. Such website operators also typically require the image to have a minimum level of sharpness, brightness, and/or clarity before permitting the image to be uploaded.

While existing photo or digital imaging systems may enable a user to capture an image of an item using a smart phone, a digital camera, or other like imaging device, the images obtained using such systems usually do not satisfy the image quality requirements described above. In particular, such systems do not enable the user to obtain shadow-free images. Further, such systems typically have limited lighting capabilities, and, as a result, the images obtained using such systems are of relatively poor quality. Further, the light assemblies associated with such systems are prone to overheating which can result in premature light source failure and/or damage to various components of the system. Additionally, such systems are not easily transportable or storable without significant disassembly.

BRIEF DESCRIPTION OF THE DRAWINGS

This detailed description makes reference to the accompanying figures. In the figures, the left-most digit(s) of a reference number identifies the figure in which the reference number first appears. The same reference numbers in different figures indicate similar or identical items.

DETAILED DESCRIPTION

Figure 1:
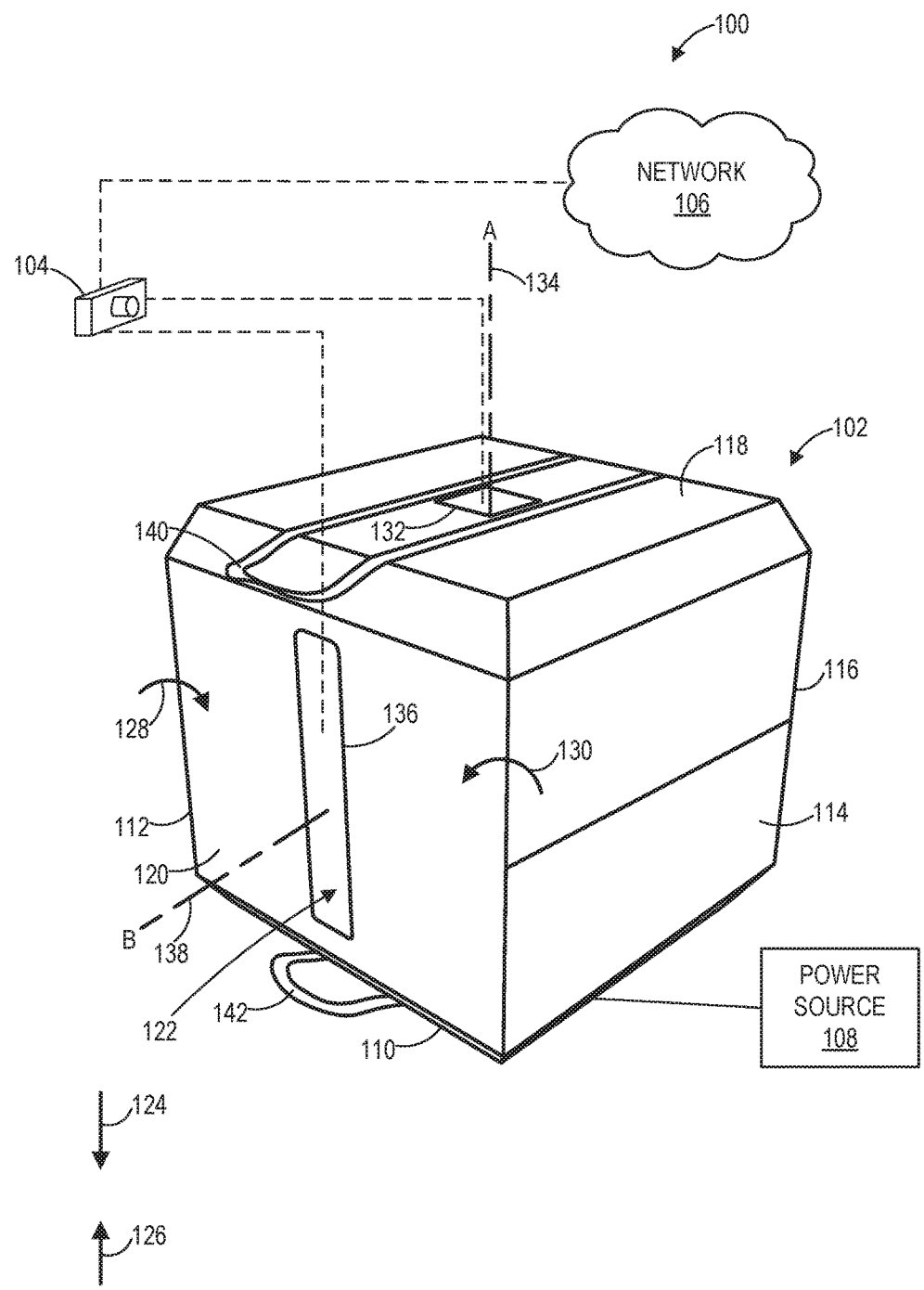
FIG. 1 illustrates an example system for capturing an image of an item.

Described herein are systems and methods related to a collapsible photo enclosure used for capturing images of an object suitable for use in an online marketplace or other website. The example systems of the present disclosure may be configured to enable a user to capture such an image using, for example, a smart phone, a digital camera, a tablet computer, a laptop, and/or other electronic device having image capture capabilities. The systems may be shaped, sized, and/or otherwise configured to accept a variety of different items of various shapes, sizes, or dimensions. Additionally, the systems of the present disclosure may include one or more light assemblies configured to illuminate an interior space of the enclosure within which the item has been disposed. Each light assembly of the present disclosure may include one or more of a light source, a heat sink, a diffuser, and/or other components. The various components of such light assemblies may be configured to assist in diffusing light emitted by a light source, increasing the thermal path between the light source and, for example, one or more surfaces or components of the photo enclosure, and blocking user access to the light source during operation of the enclosure for safety, and/or protection of lighting elements from electrostatic discharge. Such systems may also include one or more switches configured to electrically connect a light source of the light assembly with an external power source when the enclosure is in an expanded state, and to electrically disconnect the light source from the power source when the enclosure is in a collapsed state. Such switches may be a component of, for example, one or more hinge assemblies of the present disclosure configured to assist in transitioning the enclosure between the expanded state and the collapsed state, and such switches may assist in further improving the safety and reliability of the example photo enclosures described herein.

Further, such systems may include one or more layers of diffusion material moveably disposed within the interior space of the enclosure. Such materials may assist in dispersing the light generated by such light assemblies so as to improve lighting conditions within the interior space. As a result, example systems of the present disclosure may facilitate capturing digital images that are substantially free from shadows or other undesirable irregularities. Additionally or alternatively, example systems of the present disclosure may reduce and/or substantially eliminate the specular reflection of light within the interior space. Such systems may also be configured to yield digital images having relatively high levels of clarity, sharpness, brightness, and/or other visual characteristics. Further, the systems of the present disclosure may comprise enclosures that are easily transitioned between an expanded state configured to facilitate capturing digital images, and a collapsed state convenient for transporting and/or storing such an enclosure. Additionally, such enclosures may be constructed of relatively inexpensive materials so as to be affordable by small businesses or individuals.

In an example embodiment, an enclosure of the present disclosure may include a base, first and second sidewalls extending substantially perpendicularly from the base, and a back wall extending from the first sidewall to the second sidewall. The enclosure may also include a top disposed opposite the base and connected to at least one of the first sidewall, the second sidewall, or the back wall. In such examples, at least one of the sidewalls, the back wall, the base, or the top may include a light assembly configured to illuminate the interior space of the enclosure. In some examples, the top and/or one or more of the sidewalls, the back wall, or the base may include one or more light assemblies configured to illuminate the interior space, and such light assemblies may be electrically connected to a switch configured to connect a light source of the light assembly with an external power source when the enclosure is in the expanded state, and to electrically disconnect the light source from the power source when the enclosure is in a collapsed state. In such examples, the top may be movable toward the base in order to transition the enclosure from the expanded state to the collapsed state. Additionally or alternatively, the base may be movable toward the top in order to transition the enclosure from the expanded state to the collapsed state.

In some examples, the first sidewall may be foldable, bendable, and/or otherwise movable in a first direction toward the interior space as the enclosure is transitioned from the expanded state to the collapsed state. Likewise, the second sidewall maybe foldable, bendable, and/or otherwise movable in a second direction toward the interior space as the enclosure is transitioned from the expanded state to collapsed state. The first and second sidewalls may include, for example, one or more score lines, living hinges, or other like seams configured to facilitate such folding or bending. Additionally or alternatively, in some examples at least one of the first sidewall, the second sidewall, or the back wall may comprise a substantially rigid structure configured to support the top when the enclosure is in the expanded state. In such examples, the substantially rigid first sidewall, second sidewall, or back wall may assist in maintaining the enclosure in the expanded state during use.

Moreover, at least one of the walls of the enclosure may include a layer of semi-transparent diffusive material. The various layers of diffusive material included in the enclosure may assist in dispersing light and/or other radiation emitted by the light assemblies within the interior space in order to maximize the illumination capabilities of the enclosures. Such layers may also form one or more surfaces of the interior space. Accordingly, such layers may be off-white, pure white, silver, and/or any other color desirable for forming a contrasting background for the image being captured.

Since the various example enclosures described herein enable users to obtain digital images that are of relatively high quality and that are substantially shadow-free, such images generally do not require further manipulation or processing in order to satisfy the image quality requirements of most online marketplaces or other such websites. In particular, the diffusive materials and other configurations of such enclosures may be configured to reduce and/or substantially eliminate the level of specularity within the interior space and, thus, may facilitate obtaining substantially shadow-free images of items disposed within the enclosure. As a result, the user may upload and/or use such images without the added cost, time, and inconvenience associated with such additional image processing. The collapsible enclosures of the present disclosure are also relatively easy to store and/or transport.

Further, the heat dissipation provided by the example heat sinks described herein reduces the risk of damage to the light sources and other components of the enclosures. Due to such improved heat dissipation, the light sources included in the respective light assemblies may be driven at greater output levels, relative to existing light assemblies, without risking damage to the components of the enclosure. For example, increased voltage and/or current levels may be directed to the light assemblies of the present disclosure to increase output levels. Increasing the output level of the respective light sources in this way may, for example, increase the amount of light emitted by such light assemblies within the interior space, thereby improving the illumination capabilities of the enclosure. Additionally, because the output level of the light sources may be increased due to the improved heat dissipation characteristics associated with example light assemblies of the present disclosure, such light assemblies may include fewer light sources relative to existing light assemblies, thereby reducing the overall cost of the enclosure, reducing the manufacturing and/or assembly complexity of the enclosure, and improving system reliability. Additionally, by dispersing heat and/or minimizing heat diffusion by operating the light sources in a more efficient manner, the heat sinks and other components of the enclosures described herein may also reduce the risk of injury to users caused by physical contact between users and relatively hot components of the enclosures.

In example embodiments, the heat dissipation capabilities of the example light assemblies described herein may be further improved due to the configuration of the diffuser. For example, in some embodiments the heat sink may be connected to the diffuser, and the diffuser may space the heat sink from, for example, the top and/or other components of the collapsible enclosure to which the respective light assembly is connected. Such spacing may assist in thermally insulating the light sources of the respective light assembly from, for example, the top and/or other components of the collapsible enclosure. Additionally, as noted above, such diffusers may be configured to shield the user from the relatively hot light sources during use of the collapsible enclosure, and may assist in diffusing the light emitted by such light sources to further improve the illumination capabilities of the enclosures. Such capabilities solve a need that is not currently met by existing imaging systems and methods.

Referring now to FIG. 1, a detailed example of a system 100 for capturing photos or other images of an item is illustrated. The example system 100 of FIG. 1 may include, among other things, an enclosure 102 configured to house the item being photographed, an imaging device 104 configured to obtain a photo and/or other image of the item while the item is disposed within the enclosure 102, a network 106 configured for uploading, downloading, and/or otherwise transferring the image from the imaging device 104 to one or more additional devices (not shown), websites, servers, networks, and/or other locations or components accessible via the network 106, and a power source 108 selectively coupled to the enclosure 102.

The imaging device 104 may comprise, for example, a wireless phone, a tablet computer, a laptop computer, a digital camera, and/or any other device including photo, video, and/or digital imaging functionality. For example, the imaging device 104 may comprise a smart phone having a camera configured to capture video and/or digital images of an object disposed within a field of view of the camera. In such examples, the imaging device 104 may include one or more processors configured to execute stored instructions and/or to control operation of the camera in response to one or more inputs received from a user of the imaging device 104. The processors may comprise one or more cores, and may be configured to generate one or more user interfaces ("UI") configured to assist the user in operating the camera, capturing an image of an object, storing the image, and/or transferring the image from the imaging device 104 to another device and/or location via the network 106. In some examples, the imaging device 104 may include one or more input/output ("I/O") interface(s) to allow the imaging device 104 to connect to the network 106 and/or to communicate with other devices. The I/O interfaces may comprise inter-integrated circuits ("I2C"), serial peripheral interface buses ("SPI"), universal serial buses ("USB"), RS-232, media device interfaces, and so forth. The imaging device 104 may also include one or more I/O devices such as, for example, one or more displays, keyboards, mice, touchpads, touch-screens, and/or other such components. The one or more displays may be configured to provide visual output to the user. For example, the displays may be connected to the processor(s) of the imaging device 104 and may be configured to render and/or otherwise display content thereon. Such content may include, for example, the one or more UIs described above and/or one or more images of the item captured using the camera of the imaging device 104.

The imaging device 104 may also include one or more communication interfaces configured to provide a connection with and facilitate the transfer of data, images, video, files, and/or other information via the network 106. In such examples, the network 106 may include one or more personal area networks ("PAN"), local area networks ("LAN"), wide area networks ("WAN"), the internet, and so forth. For example, the communications interfaces of the imaging device 104 may include radio modules for a WiFi LAN and a Bluetooth PAN.

The imaging device 104 may also include one or more memories. The memory may comprises one or more non-transitory computer-readable storage media ("CRSM"). The CRSM may comprise one or more of an electronic storage medium, a magnetic storage medium, an optical storage medium, a quantum storage medium, a mechanical computer storage medium and so forth. The memory may provide for storage of computer readable instructions, data structures, program modules, and other data for the operation of the imaging device 104. The memory may be connected to the camera of the imaging device 104 and may also be configured to store data, images, video, files, and/or other information captured by the camera, such as images of an object disposed within the enclosure 102.

In some examples, the memory of the imaging device 104 may be fixedly connected to the imaging device 104. Additionally or alternatively, the memory may be removably connected or coupled to the imaging device 104. For example, the imaging device 104 may also include additional data storage devices (removable and/or non-removable) such as, for example, magnetic disks, optical disks, or tape. The additional data storage devices may include volatile and nonvolatile, removable and non-removable media implemented in any method or technology for storage of information, such as computer readable instructions, program modules, data, images, video, files, and/or other information.

The example enclosure 102 illustrate in FIG. 1 may comprise a collapsible photo enclosure configured to facilitate capturing images of various objects disposed therein. The various structures and/or other components of the enclosure 102 may be configured such that images captured using the enclosure 102 may be substantially free from shadows, imperfections, and/or other irregularities. In addition, the internal surfaces and/or other structures of the enclosure 102 may provide a substantially white background for such images, thereby enhancing the contrast, clarity, brightness, sharpness, and/or other visual characteristics of such images, regardless of the various shapes, sizes, contours, and/or colors of the item being imaged. Further, the enclosure 102 may include one or more light assemblies to further increase the quality of the images obtained, to assist in substantially eliminating shadows, imperfections, and/or other irregularities in such images, and to reduce and/or substantially eliminate specular reflection of radiation emitted by the light assemblies. As will be described in further detail below, the enclosure 102 may be configured to transition between an expanded state (shown in FIGS. 1 and 5) in which the enclosure 102 may be used in the image capture process, and a collapsed state (FIGS. 7 and 8) in which the enclosure 12 may be easily transported or stored.

As shown in FIG. 1, the enclosure 102 may include a plurality of walls configured to substantially surround, substantially enclose, and/or otherwise define at least part of an interior space of the enclosure 102 when in the expanded state. While illustrated in FIG. 1 as being substantially cube-shaped, in further examples, the enclosure 102 may be substantially cylindrical, substantially spherical, substantially pyramid-shaped, and/or any other three-dimensional shape when in the expanded state. Additionally, one or more of the walls may comprise an outer surface and/or an inner surface of the enclosure 102. Such outer surfaces of the enclosure 102 may be durable, substantially water resistant, substantially tear resistant, and in some examples, substantially rigid so as to provide a protective outer layer of the enclosure 102. Such inner surfaces, on the other hand, may be matted white, silver, off-white, pure white, and/or any other like color to assist in generating substantially shadow-free images. Such inner surfaces may also be at least semi-transparent, at least partially reflective, and/or configured to at least partially diffuse light emitted by the one or more light assemblies of the enclosure 102. As a result, the inner surfaces and/or inner layers of the enclosure 102 may be configured to reduce and/or substantially eliminate specular reflection of radiation emitted by the light assemblies. By minimizing and/or substantially eliminating specularity, the images captured using the enclosure 102 may be substantially shadow-free and/or otherwise substantially free from imperfections, and/or other irregularities.

In some examples, the enclosure 102 may include at least one of a base 110 disposed at the bottom of the enclosure 102, one or more sidewalls 112, 114 extending from the base 110, a back wall 116 extending from the base 110, a top 118 disposed opposite the base 110, or a front wall 120 disposed opposite the back wall 116. For example, in the expanded state shown in FIG. 1 a first sidewall 112 of the enclosure 102 may extend substantially perpendicularly from the base 110 and the top 118, and a second sidewall 114 of the enclosure 102 may be disposed opposite the first sidewall 112. In such examples, the second sidewall 114 may extend substantially parallel to the first sidewall 112, and may extend substantially perpendicularly from the base 110 and the top 118. Additionally, in the expanded state shown in FIG. 1 the back wall 116 may extend substantially perpendicularly from the base 110 and the top 118, and the back wall 116 may extend from the first sidewall 112 to the second sidewall 114.

Two or more adjacent components of the enclosure 102 may be stitched, sealed, adhered, fused, molded, combined, and/or otherwise connected through any known connection process. For example, the top 118 may be connected to the back wall 116 as well as to the first and second sidewalls 112, 114. Further, the first and second sidewalls 112, 114 may be connected to the back wall 116. Additionally, the base 110 may be connected to the first and second sidewalls 112, 114 as well as to the back wall 116. In this way, the top 118, the back wall 116, the first and second sidewalls 112, 114, and/or the base 110 may define at least part of an interior space 122 of the enclosure 102. In some examples, the front wall 120 may be connected to at least one of the top 118, the base 110, the first sidewall 112, or the second sidewall 114. In such examples, the front wall 120 may also define at least part of the interior space 122. In such examples, the front wall 120 may form a temporary and/or releasable connection with one or more of the sidewalls 112, 114, the top 118, and/or the base 110 to facilitate inserting an item into the interior space 122 and/or removing the item from the interior space 122. Such a releasable connection may be formed utilizing one or more straps, latches, buckles, brackets, ties, Velcro® components, or other releasable connection devices (not shown).

Figure 4A:
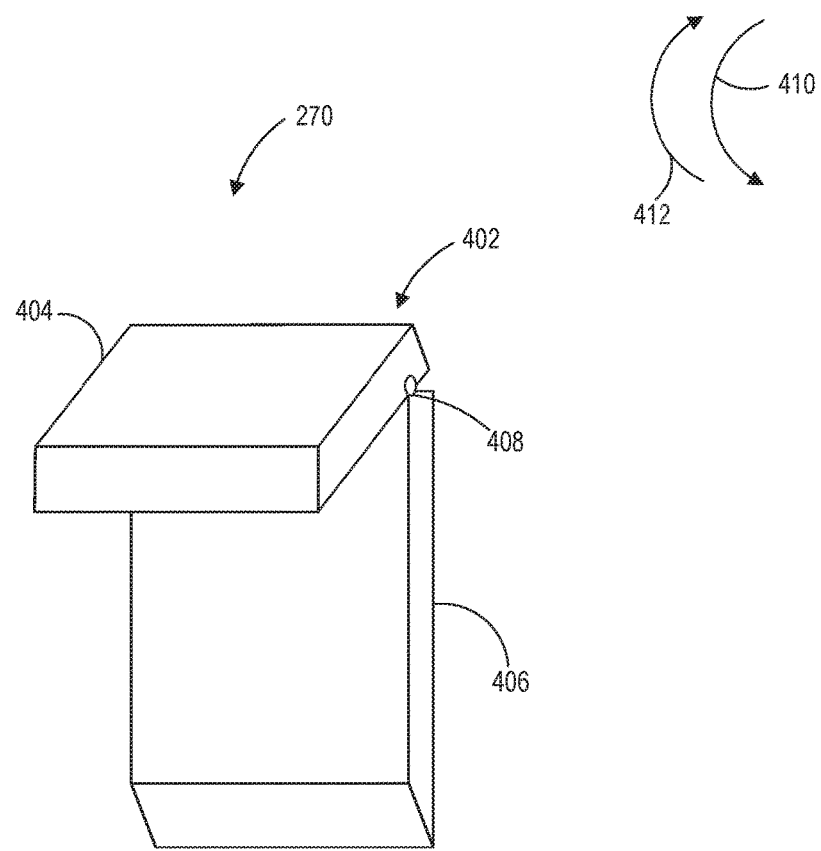
FIG. 4a illustrates an example hinge assembly associated with the enclosure of FIG. 2 while in transition between an open position and a closed position.
Figure 4B:
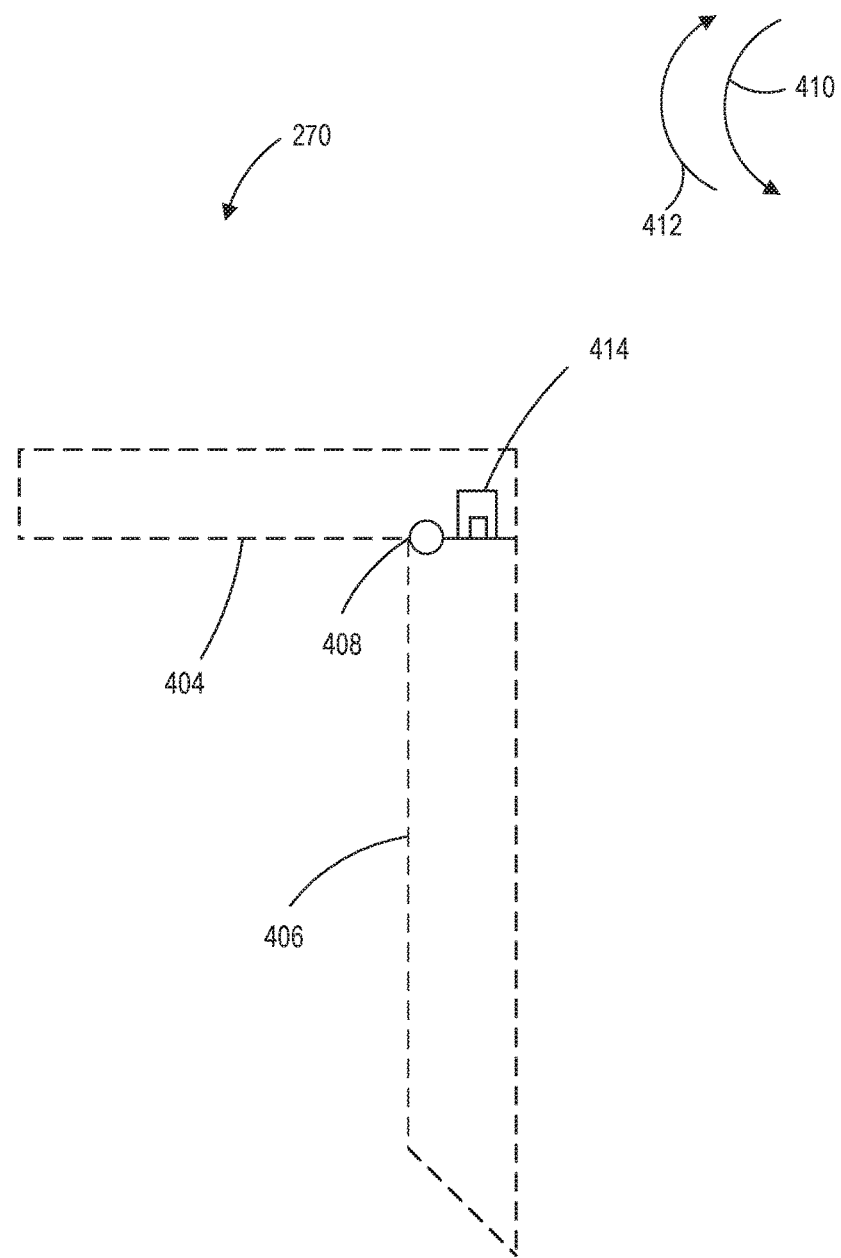
FIG. 4b illustrates the hinge assembly of FIG. 4a in the open position.
Figure 4C:
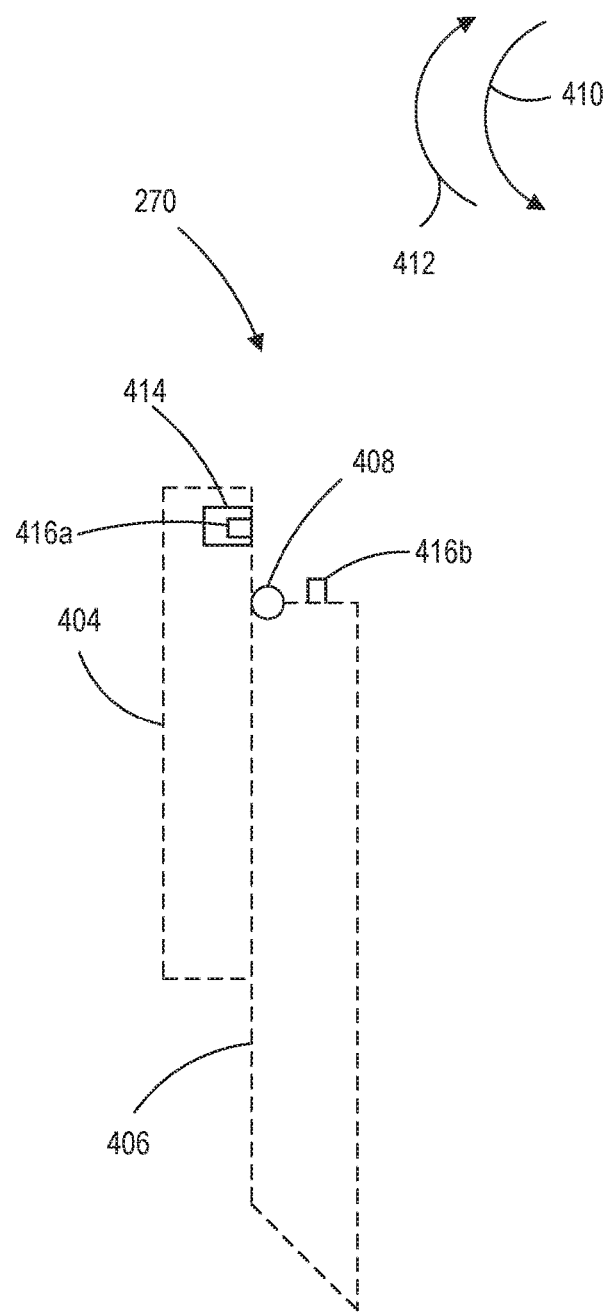
FIG. 4c illustrates the hinge assembly of FIG. 4a in the closed position.
Figure 4D:
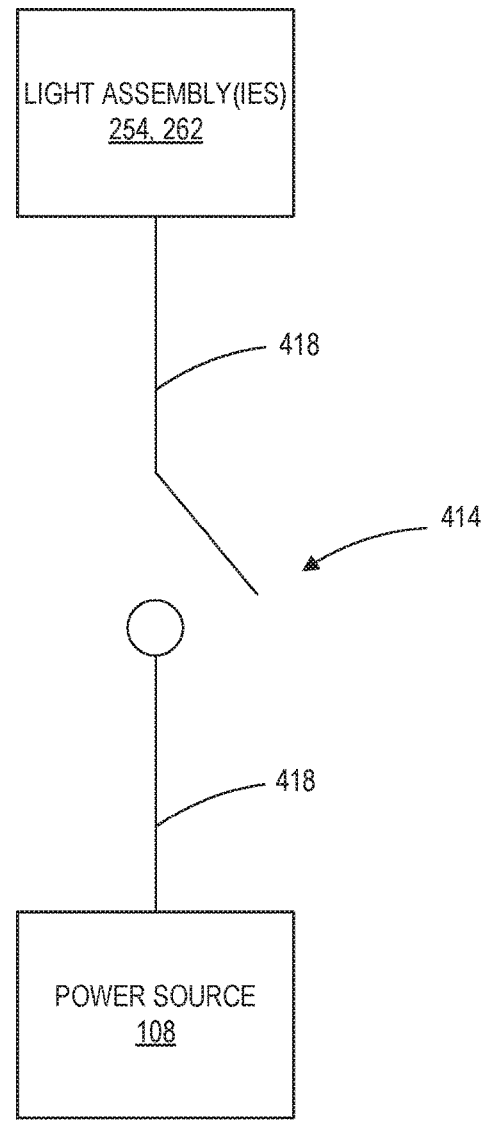
FIG. 4d illustrates an example circuit diagram associated with a switch of the present disclosure.
Figure 5:
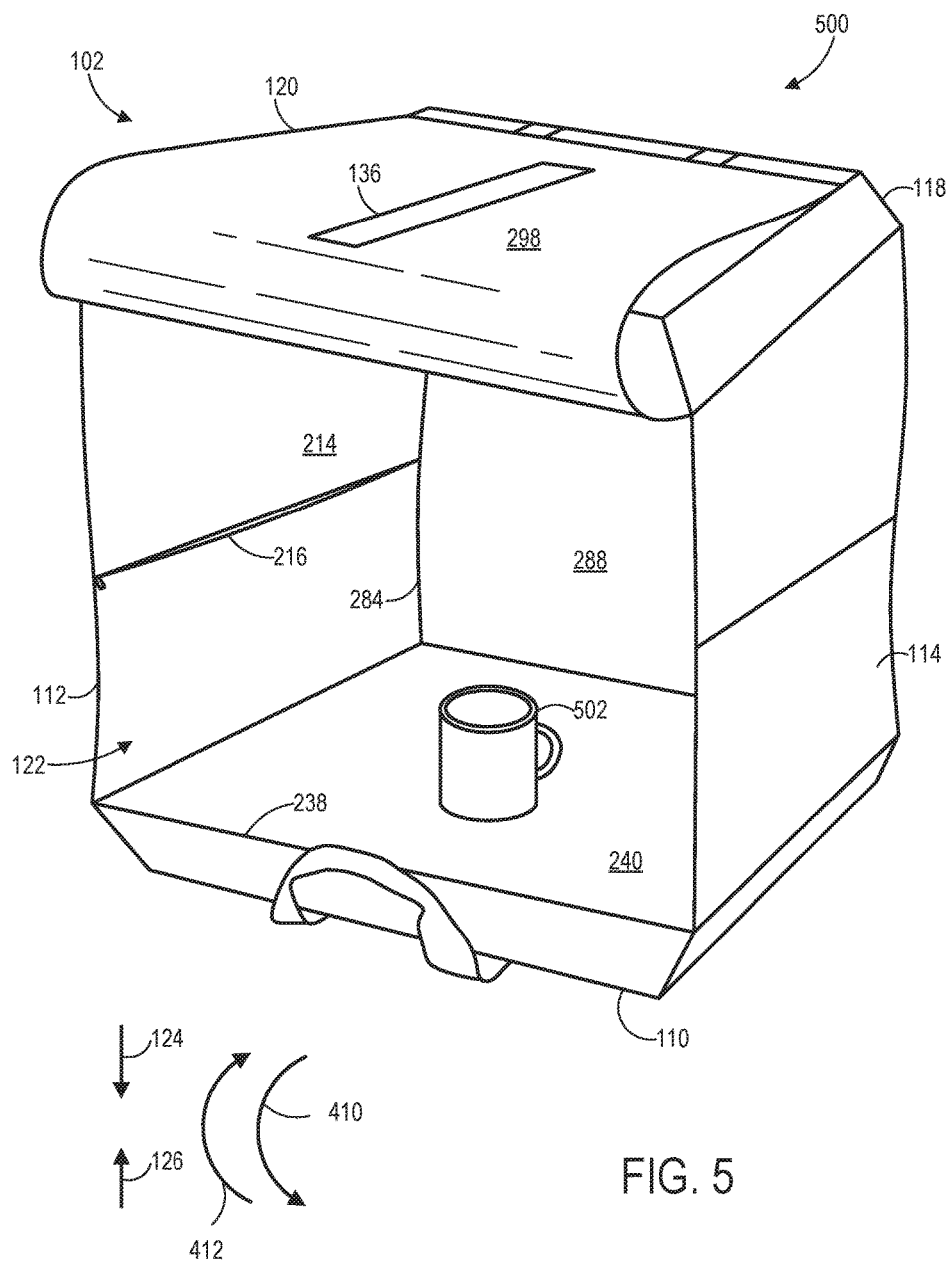
FIG. 5 illustrates the enclosure of FIG. 2 in an expanded state.

In example embodiments, the top 118 may be movable toward the base 110 in the direction of arrow 124 in order to transition the enclosure 102 from the expanded state shown in FIG. 1 to the collapsed state (FIGS. 4 and 5). Additionally or alternatively, the base 110 may be movable toward the top 118 in the direction of arrow 126 in order to transition the enclosure 102 from the expanded state to the collapsed state. As will be described in further detail below, at least one of the sidewalls 112, 114, back wall 116, front wall 120, and/or other components of the enclosure 102 may be substantially flexible, foldable, coil-able, roll-able, and/or otherwise movable or collapsible in order to facilitate transitioning the enclosure 102 between the expanded state and the collapsed state. Additionally, the enclosure 102 may include one or more mechanisms configured to provide rigidity and/or stability to the various components of the enclosure 102 while the enclosure 102 is in the expanded state. For example, such mechanisms may be engaged in order to prevent relative movement between two or more components of the enclosure 102 and/or to maintain the enclosure 102 in the expanded state. Disengaging such mechanisms, on the other hand, may permit relative movement between two or more components of the enclosure 102 and/or may permit transition of the enclosure 102 from the expanded state to the collapsed state. Alternatively, in any of the example embodiments described herein such mechanisms may be omitted. In such examples, one or more of the first sidewall 112, the second sidewall 114, or the back wall 116 may comprise a substantially rigid structure configured to support the top 118 when the enclosure 102 is in the expanded state. In such examples, the substantially rigid first sidewall 112, second sidewall 114, and/or back wall 116 may maintain the enclosure 102 in the expanded state during use.

In general, at least part of the first sidewall 112 may be movable toward the interior space 122 and/or toward the second sidewall 114 as the enclosure 102 is transitioned from the expanded state to the collapsed state. Additionally or alternatively, at least part of the second sidewall 114 may be movable toward the interior space 122 and/or toward the first sidewall 112 as the enclosure 102 is transitioned from the expanded state to the collapsed state. For example, the first sidewall 112 may be bendable, foldable, and/or otherwise collapsible, such as along a score line, living hinge, or other like seam in the first sidewall 112, in the direction of arrow 128 toward the interior space 122. Additionally or alternatively, the second sidewall 114 may be bendable, foldable, and/or otherwise collapsible, such as along a respective score line, living hinge, or other like seam in the second sidewall 114, in the direction of arrow 130 toward the interior space 122. As will be described with respect to at least FIG. 2, one or more of the sidewalls 112, 114 may include respective mechanisms configured to prevent bending and/or folding of the sidewalls 112, 114, in the direction of arrows 128, 130, while the enclosure 102 is in the expanded state.

Further, the back wall 116 and/or the front wall 120 may be bendable, foldable, and/or otherwise collapsible in a similar manner in order to facilitate transitioning the enclosure 102 from the expanded state to the collapsed state. In some examples, the back wall 116 and/or the front wall 120 may be bendable and/or foldable toward the interior space 122, such as along a respective score line, living hinge, or other like seam. In further examples, on the other hand, the back wall 116 and/or the front wall 120 may be collapsible, similar to an accordion or other substantially flexible structure as the enclosure 102 is transitioned to the collapsed state. In still further examples, at least one of the back wall 116 or the front wall 120 may be substantially rigid and may be hingedly and/or otherwise rotatably moveable toward or away from the interior space 122 to facilitate transitioning the enclosure 102 from the expanded state to the collapsed state. An example hinge assembly associated with the back wall 116 and the top 118 will be described in greater detail below with respect to FIGS. 2 and 4a-4c.

In example embodiments, the enclosure 102 may include one or more passages configured to facilitate viewing an item disposed in the interior space 122. In particular, such passages may provide access to the item and/or the interior space 122, visually or otherwise, from various locations external to the enclosure 102. Such visual access may enable a user of the enclosure 102 to capture one or more images and/or video of the item disposed within the interior space 122 via the imaging device 104. For example, the top 118 may include a passage 132 providing a line of sight 134 to the interior space 122 from a location A external to the enclosure 102. The passage 132 may comprise, for example, a channel, orifice, and/or other opening in the top 118 through which an item disposed in the interior space 122 may be viewed, such as along the line of sight 134. For example, positioning the imaging device 104 proximate, adjacent, and/or over the passage 132, such that the line of sight 134 is within a field of view of a camera of the imaging device 104, may enable the camera to obtain one or more images of the item.

Additionally or alternatively, at least one of the front wall 120, back wall 116 or sidewalls 112, 114 may include a passage similar to the passage 132 described above. For example, the front wall 120 may include a passage 136 providing a line of sight 138 to the interior space 122 from a location B external to the enclosure 102. The passage 136 may comprise, for example, a channel, orifice, and/or other opening in the front wall 120 through which an item disposed in the interior space 122 may be viewed, such as along the line of sight 138. For example, positioning the imaging device 104 proximate, adjacent, and/or over the passage 136, such that the line of sight 138 is within the field of view of the camera of the imaging device 104, may enable the camera to obtain one or more images of the item.

The enclosure 102 may have any shape, size, and/or other configuration useful in facilitating the capture of images using the imaging device 104, and as noted above, such configurations may be different from those shown in FIG. 1. Further, the enclosure 102 may include one or more additional components useful in facilitating transporting and/or storing the enclosure 102 when not in use. Although not shown in FIG. 1, such components may include, for example, one or more straps, belts, buckles, ties, brackets, or other structures to assist in maintaining the enclosure in the collapsed state during transport and/or storage. Additionally, the enclosure 102 may include one or more handles 140, 142 configured to assist the user in lifting, carrying, and/or otherwise transporting the enclosure 102 while in the collapsed state. For example, a first handle 140 may be connected to the top 118 while a second handle 142 may be connected to the base 110. In further examples, one or more additional handles may be connected to at least one of the sidewalls 112, 114. In some examples, the enclosure 102 may include one or more straps, handles, or other components connected to, for example, the top 118 and configured to assist the user in carrying the enclosure 102, lifting the top 118 to transition the enclosure from the collapsed state to the expanded state, and/or to support the top 118 when the enclosure 102 is transitioned from the expanded state to the collapsed state.

Figure 2:
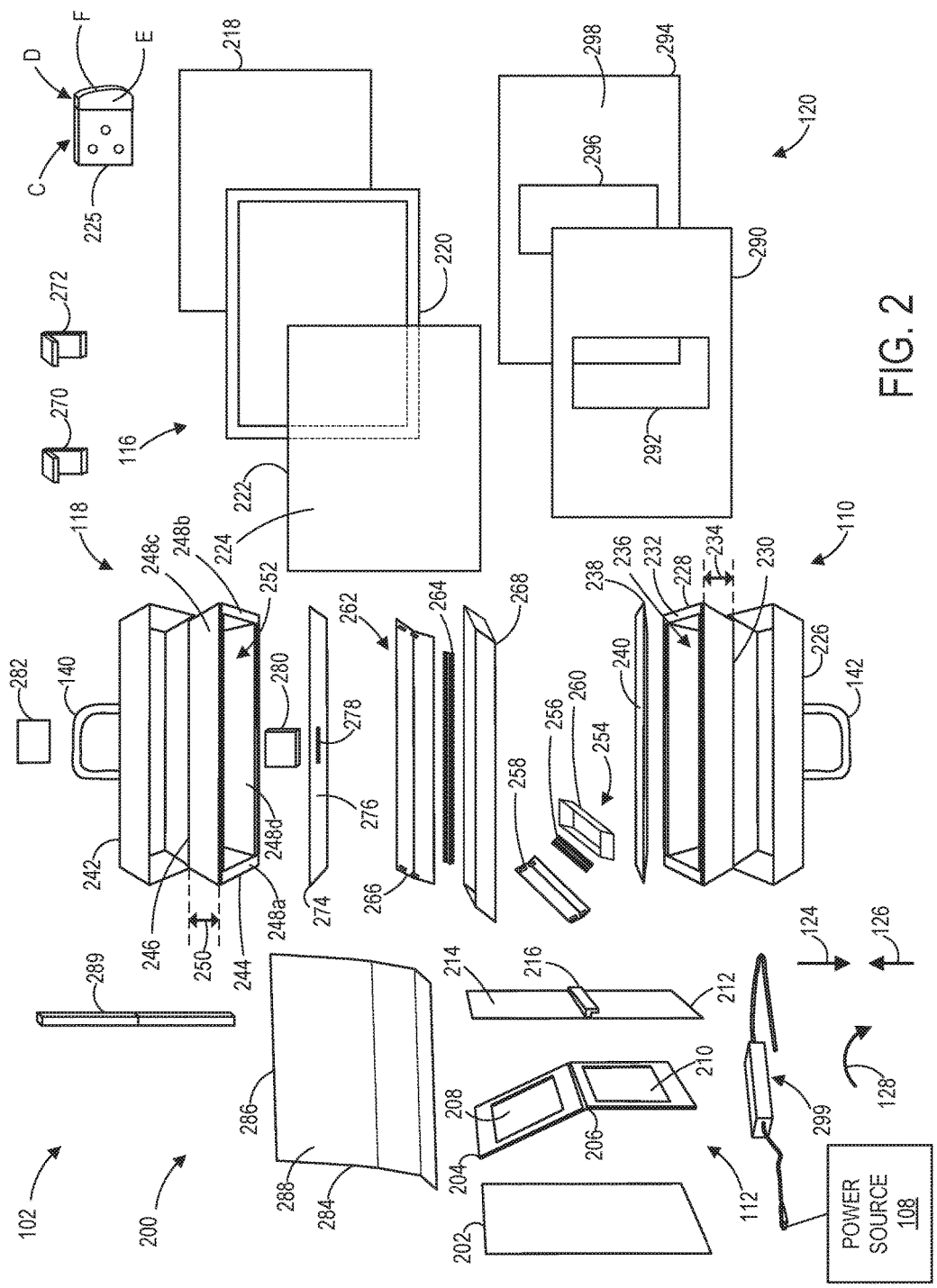
FIG. 2 illustrates an exploded view of an example enclosure of the system shown in FIG. 1.

The example embodiment 200 of FIG. 2 illustrates an exploded view of the enclosure 102 with the second sidewall 114 omitted for clarity. In the examples described herein, the first and second sidewalls 112, 114 may be substantially identical unless otherwise noted. As shown in FIG. 2, the first sidewall 112 may include a plurality of layers that are stitched, sealed, adhered, fused, molded, combined, and/or otherwise connected to form a singular wall of the enclosure 102. For example, the sidewall 112 may include an outer layer 202, and an intermediate layer 204 connected to the outer layer 202. In some examples, a surface of the outer layer 202 may comprise an outer surface of the enclosure 102. The outer layer 202 may be made from any durable, substantially water resistant, substantially tear resistant, substantially flame-retardant material configured to form a protective outer surface of the enclosure 102. In some examples, the material used to form the outer layer 202 may be substantially rigid so as to assist in forming such a protective outer layer. Alternatively, at least a portion of the outer layer 202 may be substantially flexible to allow for bending, flexing, folding, and/or other movement of various components of the first sidewall 112. In example embodiments, one or more plastics, polymers, synthetic materials, foams, or other such material may be utilized to form the outer layer 202. Such materials may include any of a variety of utility fabrics or materials such as, for example, Kevlar®, polytetrafluoroethylene, nylon, polypropylene, polyester, denier fabric, polystyrene, Mylar®, and the like. Such materials may be, for example, adhered, stitched, UV welded, heat sealed, and/or otherwise connected to a first side of the intermediate layer 204. In some examples, the outer layer 202 may be made from non-woven spunbound polypropylene or other such materials.

The intermediate layer 204 may include one or more substantially rigid components that are connected together to form a single layer of the sidewall 112. Alternatively, the intermediate layer 204 may have a substantially one-piece construction and may include one or more fold lines, score lines, die cut lines, weakened portions, and/or other like seams 206. Such seams 206 may facilitate folding, bending, and/or other relative movement between various portions of the intermediate layer 204. For example, the intermediate layer 204 may include a seam 206 extending along substantially an entire length of the intermediate layer 204, and such a seam 206 may facilitate relative movement between opposing portions of the intermediate layer 204 when the enclosure 102 is transitioned between the expanded state and the collapsed state. For example, the intermediate layer 204 may include a first panel 208 disposed on a first side of the seam 206 and a second panel 210 disposed on a second side of the seam 206 opposite the first panel 208. Each of the panels 208, 210 may comprise substantially rigid, substantially planar structures of the intermediate layer 204 configured to assist in supporting, for example, the top 118 of the enclosure 102 when the enclosure 102 is in the expanded state. The intermediate layer 204, and each of the panels 208, 210 thereof, may be made from one or more sheets of substantially rigid, substantially lightweight material. For example, one or more of the materials described above with respect to the outer layer 202 may be employed to manufacture the intermediate layer 204. Additionally or alternatively, at least part of the intermediate layer 204 may have a substantially corrugated, substantially fluted, and/or other configuration designed to provide greater structural rigidity than, for example, a non-corrugated or non-fluted intermediate layer 204 made from the same material. In example embodiments, the intermediate layer 204 may comprise a single sheet of fluted and/or corrugated polypropylene including a score line, living hinge, or other like seam 206 disposed between the first and second portions of the intermediate layer 204. Alternatively, the intermediate layer 204 may comprise a single sheet of extruded, blown, thermoformed, and/or other such foam including a score line, living hinge, or other like seam 206 disposed between the first and second portions of the intermediate layer 204. In any of the examples described herein, the first portion of the intermediate layer 204 may comprise the first panel 208 shown in FIG. 2 while the second portion of the intermediate layer 204 may comprise the second panel 210. In some examples, at least one of the first panel 208 or the second panel 210 may comprise a recessed portion of the intermediate layer 204. Such a recessed portion may facilitate mounting one or more light assemblies or additional components of the first sidewall 112 to the intermediate layer 204 while facilitating the formation of a substantially planar inner surface of the enclosure 102. For example, although not illustrated in FIG. 2, in some example embodiments at least one of the first sidewall 112 or the second sidewall 114 may include an example light assembly, and at least part of the light assembly may be connected to the intermediate layer 204, such as on at least one of the panels 208, 210 or a recessed portion thereof. In such example embodiments, the light assembly may be configured to illuminate the interior space 122 of the enclosure 102, and such a light assembly may have any desired configuration in order to direct a constant or variable amount of radiation to the interior space 122. Such light sources may comprise, for example, light emitting diodes ("LEDs") or other light-emitting devices. In some examples, such light sources may comprise low profile and/or flat-panel LED strips that are embedded within and/or otherwise connected to the respective panels 208, 210 of the intermediate layer 204. Alternatively, in other examples at least one of the first panel 208 or the second panel 210 may be substantially planar in configuration, and in such examples, such a recessed portion may be omitted and the example light assemblies described above may be disposed at other locations.

The first sidewall 112 may also include an inner layer 212 disposed opposite the intermediate layer 204 and/or opposite the outer layer 202. The inner layer 212 may be stitched, sealed, adhered, fused, molded, combined, and/or otherwise connected to the intermediate layer 204 so as to overlay at least one of the panels 208, 210. The inner layer 212 may be made from opaque material, semi and/or fully transparent material, and/or semi or fully translucent material. In examples in which one or more light assemblies are disposed on the intermediate layer 204, the inner layer 212 may be configured to facilitate the passage of light and/or other radiation emitted by the light assemblies from the light assemblies into the interior space 122. In some examples, the inner layer 212 may also be configured to collimate, diffuse, reflect, refract, filter, focus, and/or otherwise condition light and/or other radiation impinging thereon. Accordingly, in some examples, the inner layer 212 may comprise one or more layers of semi-transparent/translucent diffusive material. The inner layer 212 may be made from any of the materials described above with respect to the outer layer 202 and/or the intermediate layer 204 to facilitate such functionality. Additionally or alternatively, the inner layer 212 may be made from a substantially heat resistant polymer, synthetic material, fabric, or other such material configured to diffuse and/or reflect light. In the example shown in FIG. 2, the inner layer 212 may comprise one or more acrylic diffusion sheets. Such diffusion sheets may have a substantially one-piece construction or, alternatively, multiple sheets of material may be stitched, sealed, adhered, fused, molded, combined, and/or otherwise connected to form the inner layer 212. In some examples, the inner layer 212 of at least one of the sidewalls 112, 114, and/or of any other component of the enclosure 102 (e.g., the base 110, back wall 116, top 118, and/or front wall 120) may be made from Mylar® or other similar materials. Such materials may provide a desirable level of collimation, diffusion, reflection, refraction filtering, focusing, reduction, directionality, and/or other conditioning to light or other radiation emitted by the respective light assemblies of the present disclosure. Such materials may also provide a great deal of design flexibility in moving, positioning, and/or otherwise locating the respective light assemblies on such components of the enclosure 102. Additionally, such materials may be highly reflective and, as a result, may enable fewer light assemblies to be included in the enclosure 102 while still providing adequate light conditions (as described herein) within the interior space 122.

In example embodiments, a surface 214 of the inner layer 212 opposite the intermediate layer 204 may comprise an inner surface of the enclosure 102. Such a surface 214 may have any desirable color, optical characteristics, and/or other configuration useful in providing a desirable environment for image capture within the interior space 122. For example, the surface 214 may be matted white, off-white, pure white, silver, and/or any other color to assist in producing relatively high quality photographic images.

The first sidewall 112 may also include a tension mechanism 216. The tension mechanism 216 may be, for example, connected to the inner layer 212 and accessible via the interior space 122 of the enclosure 102. Such a tension mechanism 216 may be configured to prevent folding and/or bending of the first sidewall 112 when the enclosure 102 is in the expanded state and the tension mechanism 216 is engaged. For example, regardless of whether the inner layer 212 comprises a one-piece construction or a two-piece construction, engaging the tension mechanism 216 may draw, for example, the first panel 208 of the intermediate layer 204 in the direction of arrow 124 and toward the second panel 210. Additionally, engaging the tension mechanism 216 may draw the second panel 210 of the intermediate layer 204 in the direction of arrow 126 and toward the first panel 208. As a result, engaging the tension mechanism 216 may cause the first panel 208 to be disposed substantially coplanar with the second panel 210. Further, the tension and/or other force provided by the tension mechanism 216 to the intermediate layer 204 may prevent the first panel 208 from bending, folding, and/or otherwise moving relative to the second panel 210 while the enclosure 102 is in the expanded state. In example embodiments, the tension mechanism 216 may comprise one or more zippers, electromagnets, straps, ties, brackets, and/or other devices connected to the inner layer 212 and configured to provide the functionality described above. It is understood that in further example embodiments, one or more of the tension mechanisms 216 described herein may be omitted. In such examples, when the enclosure 102 is in the expanded state, outward and/or inward folding of one or both of the sidewalls 112, 114 may be at least partially restricted by one or more layers, panels, and/or other components of the sidewalls 112, 114, the back wall 116, and/or any other component of the enclosure 102.

Additionally, when the enclosure 102 is in the expanded state (FIG. 1), one or both of the sidewalls 112, 114 may be configured to fully support the top 118 relative to the base 110 during use. In such examples, one or both of the sidewalls 112, 114 may be substantially rigid enough when the respective sidewall 112, 114 is in a substantially planar orientation, substantially perpendicular to the top 118 and the base 110, to support the full weight of the top 118 relative to the base 110 without additional supporting force being applied to the top 118 by, for example, the back wall 116 and/or other components of the enclosure 102. In such examples, one or more of the tension mechanisms 216 described herein may assist a respective sidewall 112, 114 in providing such support. Alternatively, in embodiments in which the tension mechanisms 216 have been omitted, the structural configuration of the respective sidewall 112, 114 itself may provide such support. Additionally, one or more of the sidewalls 112, 114 may include one or more stops, brackets, braces, alignment features, or other components (not shown) to assist in supporting the top 118 as described herein.

In example embodiments, one or more walls of the enclosure 102 may include structures, components, and/or configurations that are similar to and/or the same as those described above with respect to the first sidewall 112. For example, the second sidewall 114 may be substantially identical to the first sidewall 112. Alternatively, one or more components of the first sidewall 112 may be omitted from the second sidewall 114. Additionally, the back wall 116 may have a configuration similar to that of the first and second sidewalls 112, 114. For example, the back wall 116 may include an outer layer 218, and a surface of the outer layer 218 may comprise an outer surface of the enclosure 102. The outer layer 218 may be made from any durable, substantially water resistant, substantially tear resistant, substantially flame-retardant material configured to form a protective outer surface of the enclosure 102 and, in some examples, any of the materials used to form the outer layer 202 may also be used to form the outer layer 218 of the back wall 116. At least a portion of the outer layer 218 may be substantially flexible and may allow the back wall 116 to collapse upon itself when the enclosure 102 is transitioned from the expanded state to the collapsed state. Alternatively, at least a portion of the back wall 116 may be substantially rigid in order to facilitate bending, folding, and/or other movement of the back wall 116 in a direction toward the interior space 122 when the enclosure 102 is transitioned to the collapsed state. For example, the back wall 116 may comprise a substantially rigid wall of the enclosure 102 that is rotatably connected to the top 118, the base 110, or one of the sidewalls 112, 114. For example, the back wall 116 may be configured to rotate in a direction toward the top 118 when the enclosure 102 is transitioned to the collapsed state. Additionally, the back wall 116 may be configured to rotate in a direction away from the top 118 when the enclosure 102 is transitioned to the expanded state. The top 118 may be disposed substantially perpendicular to the sidewalls 112, 114, the top 118, and the base 110, and may provide support to the top 118 when the enclosure 102 is in the expanded state. As will be described in greater detail below, in some embodiments the enclosure 102 may include one or more hinge assemblies to facilitate movement of the back wall 116.

Additionally, when the back wall 116 has been disposed substantially perpendicular to the top 118 and/or the base 110, the back wall 116 may engage one or more alignment features (not shown) disposed on one or both of the sidewalls 112, 114 and/or on the base 110. Such alignment features may engage a side edge of the back wall 116 and/or one or more corresponding features on the back wall 116 when the enclosure 102 is in the expanded state. Such engagement may maintain the back wall 116 in a position substantially perpendicular to at least one of the sidewalls 112, 114 and/or the base 110. For example, such features may form a temporary fixed relationship between the back wall 116 and at least one of the sidewalls 112, 114 and/or the base 110, and may assist in maintaining the enclosure 102 in a substantially prismatic-shaped configuration. In particular, the engagement of such features may prevent the enclosure 102 from leaning to the left or to the right (e.g., leaning in the direction of one of the sidewalls 112, 114) so as to form a substantially prismatic-shaped structure.

Additionally or alternatively, when the back wall 116 has been disposed substantially perpendicular to the top 118 and/or the base 110, the back wall 116 may engage one or more stop features (not shown) disposed on one or both of the sidewalls 112, 114 and/or on the base 110. Such stop features may engage a bottom edge of the back wall 116, a side edge of the back wall 116, and/or one or more corresponding stop features on the back wall 116 when the enclosure 102 is in the expanded state. Such engagement may terminate the rotation of the back wall 116 when the enclosure 102 is in the expanded state. For example such features may mate with the back wall 116 so as to prevent over-rotation of the back wall 116 when the enclosure is transitioned from the collapsed state to the expanded state. Instead, engagement of such stop features may stop rotation of the back wall 116 once the back wall 116 is positioned substantially perpendicular to one or both of the sidewalls 112, 114 and/or the base 110. In the example embodiments of the present disclosure, such stop features may comprise one or more substantially rigid tabs, fingers, shoulders, extensions, brackets, flanges, and/or other structures that are connected to one or both of the sidewalls 112, 114 and/or on the base 110, and that extend therefrom to mate with the back wall 116. Additionally or alternatively one or more such stop features may be connected to the back wall 116 and may extend therefrom to mate with one or both of the sidewalls 112, 114 and/or the base 110 when the back wall 116 has been disposed substantially perpendicular to the top 118 and/or the base 110.

The outer layer 218 may be stitched, sealed, adhered, fused, molded, combined, and/or otherwise connected to a first side of an intermediate layer 220 of the back wall 116. The intermediate layer 220 may include one or more substantially rigid components that are connected to form a single layer of the back wall 116. Alternatively, the intermediate layer 220 may have a substantially one-piece construction, and may be substantially rigid or substantially flexible to facilitate bending, folding, collapsing, and/or other movement of the back wall 116 as described above. In some examples, the intermediate layer 220 may include one or more fold lines, score lines, living hinges, weakened portions, and/or seams (not shown) similar to the seams 206 described above. Such seams of the intermediate layer 220 may facilitate folding, bending, and/or other relative movement between various portions of the intermediate layer 220.

The intermediate layer 220 may be made from one or more sheets of substantially rigid, substantially lightweight material. For example, one or more of the materials described above with respect to the intermediate layer 204 of the sidewall 112 may be employed to manufacture the intermediate layer 220 of the back wall 116. For example, the intermediate layer 220 may comprise a single sheet of fluted and/or corrugated polypropylene, and may include one or more score lines, living hinges, or other like seams. Alternatively, the intermediate layer 220 may comprise a sheet of foam.

Although not illustrated in FIG. 2, in some examples the back wall 116 may also include a light assembly. For example, at least part of such a light assembly may be embedded within and/or connected to the intermediate layer 220 and configured to illuminate the interior space 122. The example light assembly associated with the back wall 116 may be substantially similar to the light assembly described above (but not shown in FIG. 2) with respect to the sidewalls 114, 114, and may include one or more LEDs and/or any other light sources configured to selectively emit radiation at a desired wavelength. In some examples, the light sources may comprise low profile and/or flat-panel LED strips that are connected to the intermediate layers 204, 220.

The back wall 116 may also include an inner layer 222 disposed opposite the intermediate layer 220 and/or opposite the outer layer 218. The inner layer 222 may, for example, be connected to the intermediate layer 220, and in some examples, the inner layer 222 may overlay at least one of the example light sources described above (not shown). The inner layer 222 may be made from any of the materials described above with respect to the inner layer 212. For example, the inner layer 222 may comprise an opaque material or a semi and/or fully transparent/translucent material configured to facilitate passage of light and/or other radiation therethrough. In some examples, the inner layer 222 may also be configured to collimate, diffuse, reflect, refract, filter, focus, and/or otherwise condition light and/or other radiation impinging thereon. Accordingly, in some examples, the inner layer 222 may comprise one or more layers of semi-transparent/translucent diffusive material. In the example shown in FIG. 2, the inner layer 222 may comprise one or more acrylic or polycarbonate diffusion sheets, and a surface 224 of the inner layer 222 opposite the intermediate layer 220 may comprise an inner surface of the enclosure 102. Similar to the surface 214 of the first sidewall 112, the surface 224 may be matted white, off-white, pure white, silver, and/or any other color to assist in producing relatively high quality digital images.

In examples in which the stop features discussed above are connected to the back wall 116, the stop features may extend substantially parallel to and/or substantially coplanar with, for example, the intermediate layer 220. One example stop feature 225 is illustrated in FIG. 2. It is understood that such a stop feature 225 may be connected to the intermediate layer 220 such that the stop feature 225 is at least partially disposed between the intermediate layer 220 and the outer layer 218. Alternatively, the stop feature 225 may be connected to the intermediate layer 220 such that the stop feature 225 is at least partially disposed between the intermediate layer 220 and the inner layer 222. The stop feature 225 may include a first portion C that is stitched, screwed, bolted, adhered, sealed, molded, and/or otherwise connected to the intermediate layer 220. Additionally, at least a second portion D of the stop feature 225 may extend from the first portion C and from a side edge of the intermediate layer 220. In some examples, a surface E of the second portion D may be configured to contact and/or otherwise engage at least a portion of the second sidewall 114 when the stop feature 225 is disposed substantially perpendicular to the top 118, the base 110, and/or the sidewalls 112, 114. Additionally, in such examples a surface F of the stop feature 225 may slide along, contact, and/or otherwise engage at least part of the surface 214 of an inner layer 212 of the second sidewall 114 when the back wall 116 is transitioned between a first position substantially perpendicular to the top 118 and the base 110, and a second position substantially parallel to the top 118 and the base 110.

While FIG. 2 illustrates a single stop feature 225 configured to engage the second sidewall 114, it is understood that the enclosure may also include one or more additional stop features 225, and at least one of the additional stop features may be configured to engage the first sidewall 112. Such an additional stop feature may be substantially identical to the stop feature 225 shown in FIG. 2, and the additional stop feature may be connected to the back wall 116 opposite the stop feature 225 so as to engage the first sidewall 112 in a manner similar to and/or the same as the engagement between the stop feature 225 and the second sidewall 114 described above.

With continued reference to FIG. 2, the base 110 may include an outer layer 226 formed from any of the materials described above with respect to the outer layers 202, 218. The base 110 may also include a substantially rigid tray structure 228 providing stiffness and/or structural integrity to the base 110. In such examples, the outer layer 226 may be stitched, sealed, adhered, fused, molded, combined, and/or otherwise connected to the tray structure 228 so as to form an outer surface of the enclosure 102. The tray structure 228 may comprise a substantially one-piece construction and, in such embodiments, the tray structure 228 may be formed through any injection molding, thermoforming, extrusion, and/or other formation process. Additionally or alternatively, one or more components of the tray structure 228 may be stitched, sealed, adhered, fused, molded, combined, and/ or otherwise connected together. The tray structure 228 and its components may be formed from any of the materials described above with respect to the intermediate layers 204, 220. For example, one or more components of the tray structure 228 may be made from one or more pieces or sheets of fluted and/or corrugated polypropylene.

In example embodiments, the tray structure 228 may include one or more components configured to define a recess or other like cavity within the base 110. Such a cavity may be useful in, for example, receiving one or more of the sidewalls 112, 114, the back wall 116, and/or other components of the enclosure 102 when the enclosure is transitioned to the collapsed state.

As shown in FIG. 2, the tray structure 228 may include a substantially planar plate 230 extending substantially parallel to the top 118, and a plurality of legs 232 extending from the plate 230 in a direction generally toward the top 118. In some examples, the legs 232 may extend substantially perpendicularly from the plate 230. In other examples, however, at least one of the legs 232 may extend from the plate 230 at an obtuse included angle. Accordingly, as shown in FIG. 2, the tray structure 228 may have a substantially trapezoidal three-dimensional shape, and at least one of the legs 232 may extend from the plate 230 so as to form a gap 234 between a topmost surface of the plate 230 and a topmost surface of the at least one leg 232. In this way, the gap 234 formed between the topmost surface of the plate 230 and the topmost surface of the at least one leg 232 may define at least a portion of a cavity 236 of the tray structure 228. In particular, one or more components of the enclosure 102, such as one or both of the sidewalls 112, 114 and/or the back wall 116 may be disposed at least partially within the cavity 236 when the enclosure 102 is in the collapsed state.

As shown in FIG. 2, the base 118 may also include an inner layer 238 disposed on the tray structure 228, and the inner layer 238 may overlay at least a portion of the plate 238 and at least a portion of one or more of the legs 232. The inner layer 238 may, in some examples, be stitched, sealed, adhered, fused, molded, combined, and/or otherwise connected to the plate 238 and/or one or more of the legs 232. The inner layer 238 may be made from any of the materials described above with respect to the inner layer 212. For example, the inner layer 238 may comprise a semi and/or fully transparent material configured to facilitate passage of light and/or other radiation therethrough. In some examples, the inner layer 238 may also be configured to collimate, diffuse, reflect, refract, filter, focus, and/or otherwise condition light and/or other radiation impinging thereon. Accordingly, in some examples, the inner layer 238 may comprise one or more layers of semi-transparent diffusive material. In the example shown in FIG. 2, the inner layer 238 may comprise one or more acrylic diffusion sheets, and a surface 240 of the inner layer 238 opposite the plate 230 may comprise an inner surface of the enclosure 102. Similar to the surface 214 of the first sidewall 112, the surface 240 may be matted white, off-white, pure white, silver, and/or any other color to assist in producing relatively high quality photographic images. In other examples, the legs 232 of the tray structure 228 may be omitted and, in such examples, the base 110 may comprise a substantially planar structure without the gap 234. For example, in some embodiments the base 110 may be formed by the substantially planar plate 230 having an outer layer 226 and an inner layer 238.

With continued reference to FIG. 2, the top 118 may have a configuration that is substantially similar to the base 110. For example, the top 118 may include an outer layer 242 similar to and/or formed from any of the materials described above with respect to the outer layers 202, 218, 226. The top 118 may also include a substantially rigid tray structure 244 providing stiffness and/or structural integrity to the top 118, and the tray structure 244 of the top 118 may be substantially similar to the tray structure 228 of the base 110. In some examples, the top 118 may also include a substantially clear acrylic hook or other attachment device (not shown) configured to support jewelry or other objects within the interior space 122.

The outer layer 242 may be connected to the tray structure 244 so as to form an outer surface of the enclosure 102. The tray structure 244 may comprise a substantially one-piece construction and, in such embodiments, the tray structure 244 may be formed through any injection molding, thermoforming, extrusion, and/or other formation process. Additionally or alternatively, one or more components of the tray structure 244 may be stitched, sealed, adhered, fused, molded, combined, and/or otherwise connected together. The tray structure 244 and its components may be formed from any of the materials described above with respect to the intermediate layers 204, 220. For example, one or more components of the tray structure 244 may be made from one or more pieces or sheets of fluted and/or corrugated polypropylene.

In example embodiments, the tray structure 244 may include one or more components configured to define a recess or other like cavity within the top 118. Such components may include a substantially planar plate 246 extending substantially parallel to the base 110, and a plurality of legs 248a-248d (collectively, "legs 248") extending from the plate 246 in a direction generally toward the base 110. In some examples, the legs 248 may extend substantially perpendicularly from the plate 246. In other examples, however, at least one of the legs 248 may extend from the plate 246 at an obtuse included angle. Accordingly, as shown in FIG. 2, the tray structure 244 may have a substantially trapezoidal three-dimensional shape, and at least one of the legs 248 may extend from the plate 246 so as to form a gap 250 between a topmost surface of the plate 246 and a topmost surface of the at least one leg 248. In this way, the gap 250 formed between the topmost surface of the plate 246 and the topmost surface of the at least one leg 248 may define at least a portion of a cavity 252 of the tray structure 244.

The top 118 may also include a light assembly 254. In some examples, the light assembly 254 may be embedded within and/or otherwise connected to the plate 246. In particular, the light assembly 254 may be connected to the topmost surface of the plate 246 and may be configured to illuminate at least a portion of the interior space 122. The light assembly 254 may be substantially similar to the light assembly described above with respect to the sidewalls 112, 114 and the back wall 116, and may include one or more LEDs and/or any other light sources configured to selectively emit radiation at a desired wavelength. In some examples, the light sources of the light assembly 254 may comprise low profile and/or flat-panel LED strips that are adhered and/or otherwise connected to the topmost surface of the substantially planar plate 246.

As shown in FIG. 2, in further examples, the light assembly 254 may include one or more components configured to shield users from the relatively hot light sources during use, to diffuse light emitted by the light sources, to substantially thermally isolate the light sources from the plate 260 and/or other components of the enclosure 102, and to act as a platform for supporting the light sources as well as for connecting the light assembly 254 to the top 118. For example, the light assembly 254 may include one or more light sources 256, a heat sink 258, and a diffuser 260. In example embodiments, the light sources 256 may be disposed on and/or otherwise connected to a substrate, and the substrate may be disposed on and/or otherwise connected to the heat sink 258. Additionally, the heat sink 258 may be connected to the diffuser 260, and the diffuser 260 may be connected to one of the top 118 or the base 110 such that the heat sink 258 and the light sources 256 are spaced from the one of the top 118 or the base 110. For example, the diffuser 260 may include one or more brackets, mounts, stand-offs, spacers, and/or other components (not shown) configured to facilitate mounting the diffuser 260 to one of the top 118 or the base 110 such that a gap is created between the heat sink 258 and/or the light sources 256, and the component of the enclosure 102 (e.g., the top 118 or the base 110) to which the diffuser 260 is connected. The light assembly 254 may be disposed at any location along the top 118 or the base 110 to facilitate illuminating at least a portion of the inner space 122. In some examples, the light assembly 254 may be disposed adjacent to, substantially parallel to, and/or substantially along at least one of the legs 248. For example, as shown schematically in FIG. 2, the light assembly 254 may be connected to the plate 246 at a location adjacent to, substantially parallel to, and/or substantially along a first leg 248a. In such examples, the light assembly 254 may also be connected to the plate 246 at a location adjacent to, substantially parallel to, and/or substantially along the first sidewall 112, the second sidewall 114, or the back wall 116. In such examples, the light assembly 254 may comprise a first light assembly 254 of the enclosure 102, and the enclosure may include one or more additional light assemblies to facilitate illuminating the interior space 122.

For example, the enclosure 102 may further include a second light assembly 262 separate from the first light assembly 254. In some examples, the second light assembly 262 may be substantially similar to and/or the same as the first light assembly 254. For example, the second light assembly 262 may include one or more components configured to shield users from the relatively hot light sources during use, to diffuse light emitted by the light sources, to substantially thermally isolate the light sources from the plate 260 and/or other components of the enclosure 102, and to act as a platform for supporting the light sources as well as for connecting the light assembly 262 to the top 118. For example, the second light assembly 262 may include one or more light sources 264, a heat sink 266, and a diffuser 268. In example embodiments, the light sources 264 may be disposed on and/or otherwise connected to a substrate, and the substrate may be disposed on and/or otherwise connected to the heat sink 266. Additionally, the heat sink 266 may be connected to the diffuser 268, and the diffuser 268 may be connected to one of the top 118 or the base 110 such that the heat sink 266 and the light sources 264 are spaced from the one of the top 118 or the base 110. For example, the diffuser 268 may include one or more brackets, mounts, stand-offs, spacers, and/or other components (not shown) configured to facilitate mounting the diffuser 268 to one of the top 118 or the base 110 such that a gap is created between the heat sink 266 and/or the light sources 264, and the component of the enclosure 102 (e.g., the top 118 or the base 110) to which the diffuser 268 is connected. The second light assembly 262 may be disposed at any location along the top 118 or the base 110 to facilitate illuminating at least a portion of the inner space 122. In some examples, the light assembly 262 may be disposed adjacent to, substantially parallel to, and/or substantially along at least one of the legs 248. For example, as shown schematically in FIG. 2, the light assembly 262 may be connected to the plate 246 at a location adjacent to, substantially parallel to, and/or substantially along a front-most leg 248c of the enclosure 102. The second light assembly 262 may also be connected to the plate 246 at a location adjacent to, substantially parallel to, and/or substantially along the first sidewall 112, the second sidewall 114, or the back wall 116. As illustrated in FIG. 2, the second light assembly 262 may be positioned substantially perpendicular to the first light assembly 254 or, alternatively, the second light assembly 262 may be positioned substantially parallel to the first light assembly 254 within the enclosure 102.

The example embodiments of the enclosure 102 described herein may be configured to provide studio quality light dimensionality and, thus, may facilitate obtaining relatively high quality digital images of objects disposed within the interior space 122. For example, one or more of the light assemblies 254, 262 and/or the various inner layers described herein may facilitate obtaining substantially shadow-free images with minimal specularity, and one or more additional light assemblies may provide directional accent illumination while the image is being captured. Such directional accent illumination or "fill" illumination may, for example, provide additional front and/or side reflection during image capture sessions and may add softness, sharpness, or other desired dramatic effects to the captured image. In this way, such directional accent illumination may improve the overall quality of the image obtained using the enclosure. In some examples, at least one of the light assemblies 254, 262 may be employed for illuminating the interior space 122 and substantially eliminating shadows. In such examples, at least one of the light assemblies 254, 262 included in the enclosure 102 may provide at least a portion of the directional accent illumination described above.

In some examples, the light assemblies 254, 262 of the enclosure 102 may be configured to emit and/or provide at least approximately 14,000 lumens per square foot to the interior space 122. In further examples it is understood that, together or separately, the light assemblies 254, 262 of the enclosure 102 may be configured to emit or provide less than approximately 14,000 lumens per square foot of light. Additionally, in any of the embodiments described herein, the light sources 256, 264 may have an operating temperature below approximately 50° C. such that, during use, the light sources 256, 264 may give off no greater than approximately 50° C. In some examples, one or more of the top 118 or the sidewalls 112, 114 may include one or more thermal insulation strips or other insulation components to protect components of the enclosure 102 from damage and/or to protect the users from harm caused by the heat generated by the light sources 256, 264. In some examples, such insulation may comprise an insulation fabric woven and/or otherwise integrated into the outer layer 202, 242, the inner layer 212, 274, and/or other components of the enclosure 102.

Additionally, each of the light sources 256, 264 may be characterized by a daylight-balanced lighting temperature of less than approximately 6500 Kelvin. In some examples, the light sources 256, 264 may be characterized by a daylight-balanced lighting temperature of between approximately 5500 Kelvin and approximately 6500 Kevin. Further, each light source 256, 264 may be configured to emit or provide at least approximately 500 lumens per square foot of light to the interior space 122, and in some examples, each light source 256, 264 may be configured to emit or provide between approximately 700 lumens per square foot and approximately 900 lumens per square foot. Such lighting parameters may provide for optimal image capturing conditions within the interior space 122 and may assist in generating, for example, substantially shadow-free images with the imaging device 104. The light assemblies 254, 262 will be described in greater detail below with respect to FIGS. 3a-3c.

As noted above, the back wall 116 may be moveable with respect to the top 118. In some examples, the enclosure 102 may include one or more hinge features 270, 272 to facilitate such movement. For example, the one or more hinge features 270, 272 may be connected to the top 118 and to the back wall 116, and may enable the back wall 116 to pivot toward the top 118 when the enclosure 102 is transitioned to the collapsed state. The one or more hinge features 270, 272 may also enable the back wall 116 to pivot away from the top 118 when the enclosure 102 is transitioned to the expanded state. The hinge features 270, 272 will be described in greater detail below with respect to FIGS. 4a-4d.

With continued reference to FIG. 2, the top 118 may further include an inner layer 274 connected to the plate 246, the legs 248, and/or other components of the tray structure 244 so as to overlay such components. The inner layer 274 may be made from any of the materials described above with respect to the inner layer 212. For example, the inner layer 274 may comprise a semi and/or fully transparent material configured to facilitate passage of light and/or other radiation therethrough. In some examples, the inner layer 274 may also be configured to collimate, diffuse, reflect, refract, filter, focus, and/or otherwise condition light and/or other radiation impinging thereon. Accordingly, in some examples, the inner layer 274 may comprise one or more layers of semi-transparent diffusive material. In some examples, the light assemblies 254, 262 described herein may be disposed on top of the inner layer 274 such that the inner layer 274 may be disposed between, for example, a portion of the plate 246 and such light assemblies 254, 262. Alternatively, in other examples, a portion of the inner layer 274 may overlay at least one of the light assemblies 254, 262. In the example shown in FIG. 2, the inner layer 274 may comprise one or more acrylic diffusion sheets, and the inner layer 274 may include a surface 276 forming at least part of the interior space 122. Similar to the surface 214 of the first sidewall 112, the surface 276 may be matted white, off-white, pure white, silver, and/or any other color to assist in producing relatively high quality photographic images.

In some examples, the inner layer 274 may include one or more openings 278. Such openings 278 may comprise at least a portion of the passage 132 described above, and may assist in providing the line of sight 134 to the interior space 122. In such examples, the outer layer 242, plate 246, and/or other components of the top 118 may also include openings substantially aligned with and/or otherwise having substantially the same shape, size, location, and/or other configurations of the opening 278. In such examples, the various openings formed by components of the top 118 may assist in forming at least a portion of the passage 132.

The top 118 may also include a plug 280 removably disposed within the passage 132. For example, the plug 280 may comprise a piece of foam, cloth, polymer, acrylic, and/or other material configured to substantially fill the passage 132 when the passage 132 is not in use. For example, a bottom surface of the plug 280 may mate with the surface 276 and may be disposed substantially coplanar with the surface 276 while the plug 280 is disposed within the passage 132. Additionally, the bottom surface of the plug 280 may be matted white, off-white, pure white, silver, and/or any other color so as to match a color of the surface 276. Further, the top 118 may include a cover 282 hingedly, rotatably, and/or otherwise movably connected to the outer layer 242. For example, a first part of the cover 282 may be fixedly connected to the outer layer 242 while a second part of the cover 282 may be removably connected to the outer layer 242 (e.g., via one or more ties, Velcro® strips, or other connection components) in order to facilitate opening and closing of the cover 282. Opening the cover 282 may expose the passage 132 and/or the plug 280. Alternatively, in some examples the cover 282 may be completely removed from the outer layer 242 in order to expose the passage 132 and/or the plug 280. The plug 280 may be accessed and/or removed from the passage 132 by opening or removing the cover 282. The cover 282 may be made from any of the materials described herein with respect to, for example, the outer layer 202 and/or other components of the enclosure 102.

With continued reference to the embodiment 200 shown in FIG. 2, in some examples the enclosure 102 may also include one or more layers 284 of semi-transparent material movably disposed within the interior space 122. For example, the enclosure 102 may include one or more such layers 284 connected to at least one of the top 118, the base 110, the back wall 116, the first sidewall 112, or the second sidewall 114. In such embodiments, the layer 284 may be movable to any desired position within the enclosure 102 in order to provide additional diffusion of light and/or other radiation emitted by one or more of the light assemblies described above. For example, a top and/or side 286 of the layer 284 may be connected to at least one of the top 118 or the back wall 116, and the layer 284 may have a length sufficient to overlay at least a portion of the base 110. In particular, the layer 284 may overlay at least a portion of a light assembly (not shown) included in and/or connected to the base 110. In such examples, the layer 284 may also overlay at least a portion of a light assembly (not shown) included in and/or connected to the back wall 116. In any of the examples described herein, the layer 284 may provide additional diffusion of visible light emitted by one or both of the light assemblies 254, 262 connected to the top 118. Such additional diffusion may be desirable in certain situations in order to achieve sharper images, greater contrast between different colors and/or surfaces of the item being imaged, and/or otherwise improved image characteristics.

In example embodiments, the layer 284 may be made from any of the materials described above with respect to the inner layer 212. For example, the layer 284 may comprise one or more layers of a semi and/or fully transparent material configured to facilitate passage of light and/or other radiation therethrough. In some examples, the layer 284 may also be configured to collimate, diffuse, reflect, refract, filter, focus, and/or otherwise condition light and/or other radiation impinging thereon. In the example shown in FIG. 2, the layer 284 may comprise one or more acrylic diffusion sheets. Additionally, the layer 284 may include a surface 288 forming at least part of an inner surface of the interior space 122. Similar to the surface 214 of the first sidewall 112, the surface 288 may be matted white, off-white, pure white, silver, and/or any other color to assist in producing relatively high quality photographic images. In order to reliably stow the layer 284 when the enclosure 102 is transitioning from the expanded state to the collapsed state, and/or in order to stow the layer 284 when the enclosure 102 is in the collapsed state, the enclosure 102 may include one or more retention features (not shown) configured to retain the layer 284. For example, such retention features may include one or more pieces of flexible material, such as Spandex®, configured to accept the layer 284 in a rolled-up configuration, and to retain the layer 284 when the enclosure 102 is not in use. In other examples, such retention features may comprise one or more ties, straps, brackets, Velcro®-type components, or other structures configured to maintain the layer 284 in a substantially folded or rolled-up configuration within the interior space 122. In some examples, the layer 284 may be configured to roll-up or to fold-up in any variety of ways in order to assist in stowing the layer 284 when the enclosure 102 is in the collapsed state. In some examples, one or more such retention features may also be configured to stow and/or otherwise retain the back wall 116 in a position substantially parallel to the top 118 while the enclosure 102 is being transitioned to and/or is in the collapsed state.

Additionally, the enclosure 102 may include one or more locking structures 289 configured to maintain the enclosure 102 in the expanded state while the back wall 116 is being transitioned from a first position substantially perpendicular to the top 118, the base 110, and/or the sidewalls 112, 114, to a second position substantially parallel to the top 118 and/or the base 110. For example, the locking structures 289 may be connected to at least one of the top 118 or the base 110 and configured to prevent the enclosure 102 from transitioning to the collapsed state while the locking structures 289 are engaged. A user may unlock or otherwise disengage the locking structures 289 to enable the enclosure 102 to transition from the expanded state to the collapsed state. Such locking features 289 may enable the user to trigger the collapse of the enclosure 102 independent of the position of the back wall 116.

The front wall 120 of the enclosure 102 may include one or more layers that are similar to and/or the same as the various layers described above with respect to the sidewalls 112, 114 and/or the back wall 116. For example, front wall 120 may include an outer layer 290 having an opening 292, and a surface of the outer layer 290 may comprise an outer surface of the enclosure 102. The outer layer 290 may be made from any durable, substantially water resistant, substantially tear resistant, material configured to form a protective outer surface of the enclosure 102 and, in some examples, any of the materials used to form the outer layer 202 may also be used to form the outer layer 290 of the front wall 120. At least a portion of the outer layer 290 may be substantially flexible and may allow the front wall 120 to bend, roll-up, and/or collapse upon itself when the enclosure 102 is transitioned from the expanded state to the collapsed state. Alternatively, at least a portion of the front wall 120 may be substantially rigid in order to facilitate bending, folding, and/or other movement of the front wall 120 in a direction toward the interior space 122 when the enclosure 102 is transitioned to the collapsed state.

The front wall 120 may be stitched, sealed, adhered, fused, molded, combined, and/or otherwise connected to at least one of the top 118, the base 110, the first sidewall 112, or the second sidewall 114. Additionally, the front wall 120 may be removably connected to one or more of the top 118, the base 110, the first sidewall 112, or the second sidewall 114. In this way, the front wall 120 may be opened and/or removed in order to provide access to the interior space 122 of the enclosure 102. Providing access in this way may facilitate, for example, disposing an item to be photographed within the interior space 122 and/or removing the item from the interior space 122.

The opening 292 of the outer layer 290 may comprise at least a portion of the passage 136 described above, and may assist in providing the line of sight 138 to the interior space 122. In such examples, an inner layer 294 and/or other components of the front wall 120 may also include an opening 296 substantially aligned with and/or otherwise having substantially the same shape, size, location, and/or other configurations of the opening 292. In such examples, the various openings formed by components of the front wall 120 may assist in forming at least a portion of the passage 136. Further, the front wall 120 may include a cover (not shown) similar to the cover 282 described above. For example, a first part of the cover of the front wall 120 may be fixedly connected to the outer layer 290 while a second part of the cover may be removably connected to the outer layer 290 in order to facilitate opening and closing of the cover. Opening the cover of the front wall 120 may expose the passage 136, and the cover may be made from any of the materials described herein with respect to, for example, the outer layer 202 and/or other components of the enclosure 102.

The inner layer 294 may, for example, be connected to the outer layer 290 so as to overlay at least a portion of the outer layer 290. The inner layer 294 may be made from any of the materials described above with respect to the inner layer 212. For example, the inner layer 294 of the front wall 120 may comprise a semi and/or fully transparent material configured to facilitate passage of light and/or other radiation therethrough. In some examples, the inner layer 294 may also be configured to collimate, diffuse, reflect, refract, filter, focus, and/or otherwise condition light and/or other radiation impinging thereon. Accordingly, in some examples, the inner layer 294 may comprise one or more layers of semi-transparent diffusive material, and a surface 298 of the inner layer 294 may comprise and/or otherwise form an inner surface of the enclosure 102. In the example shown in FIG. 2, the inner layer 294 may comprise one or more acrylic diffusion sheets. Similar to the surface 214 of the first sidewall 112, the surface 298 may be matted white, off-white, pure white, silver, and/or any other color to assist in producing relatively high quality photographic images.

In the example embodiment 200 shown in FIG. 2, the enclosure 102 may be selectively connected to the power source 108, and the power source 108 may comprise a wall outlet, a battery pack, and/or any other supply of alternating current or direct current. In examples in which the power source 108 comprises a wall outlet providing approximately 120 volts of alternating current, an example system 100 of the present disclosure may further include one or more adapters 299 configured to convert the current to direct current. The power source 108 and/or the adapter 299 may transmit such direct current to the one or more light assemblies of the enclosure 102.

Figure 3A:
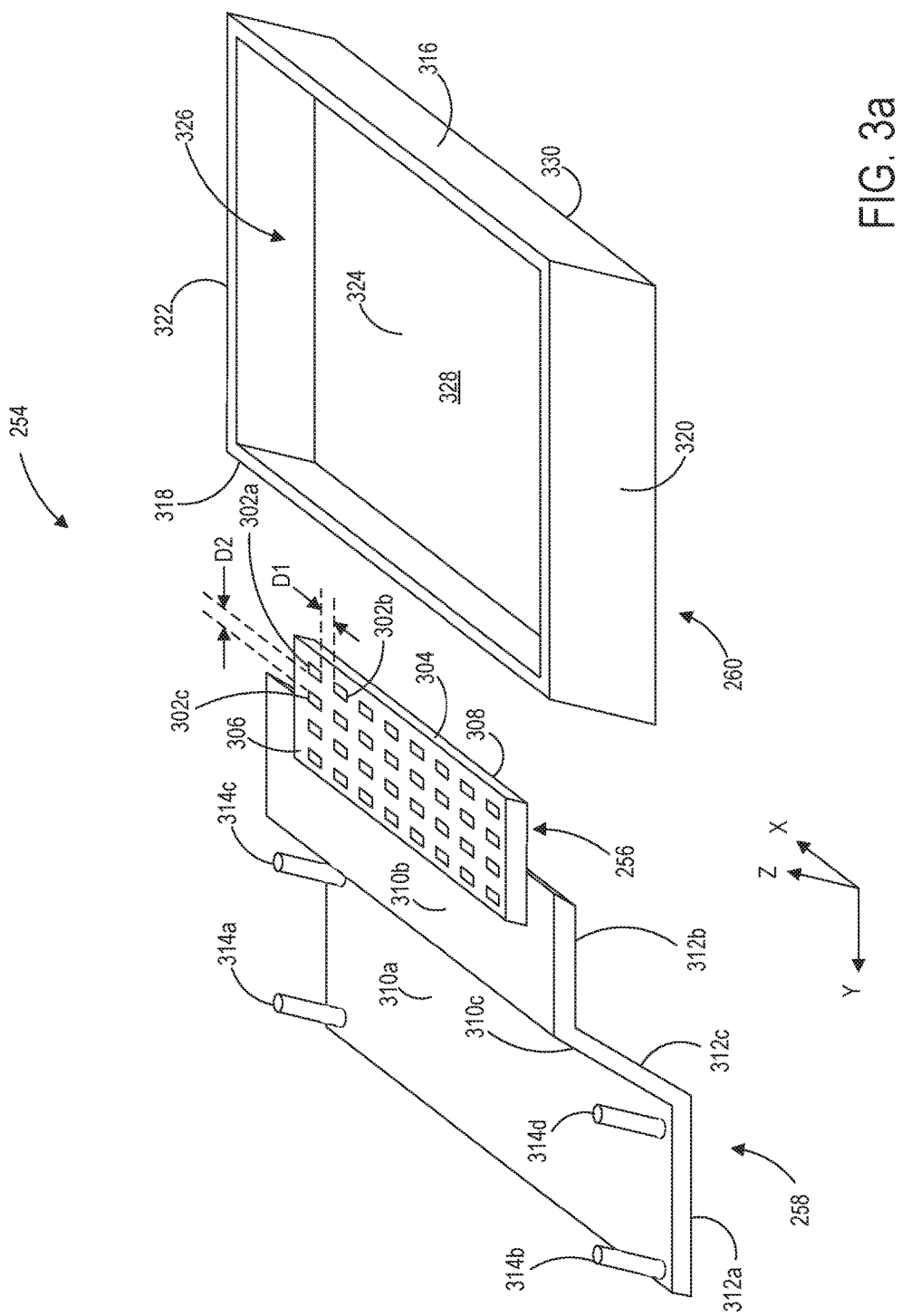
FIG. 3a illustrates an example light assembly associated with the enclosure of FIG. 2.
Figure 3B:
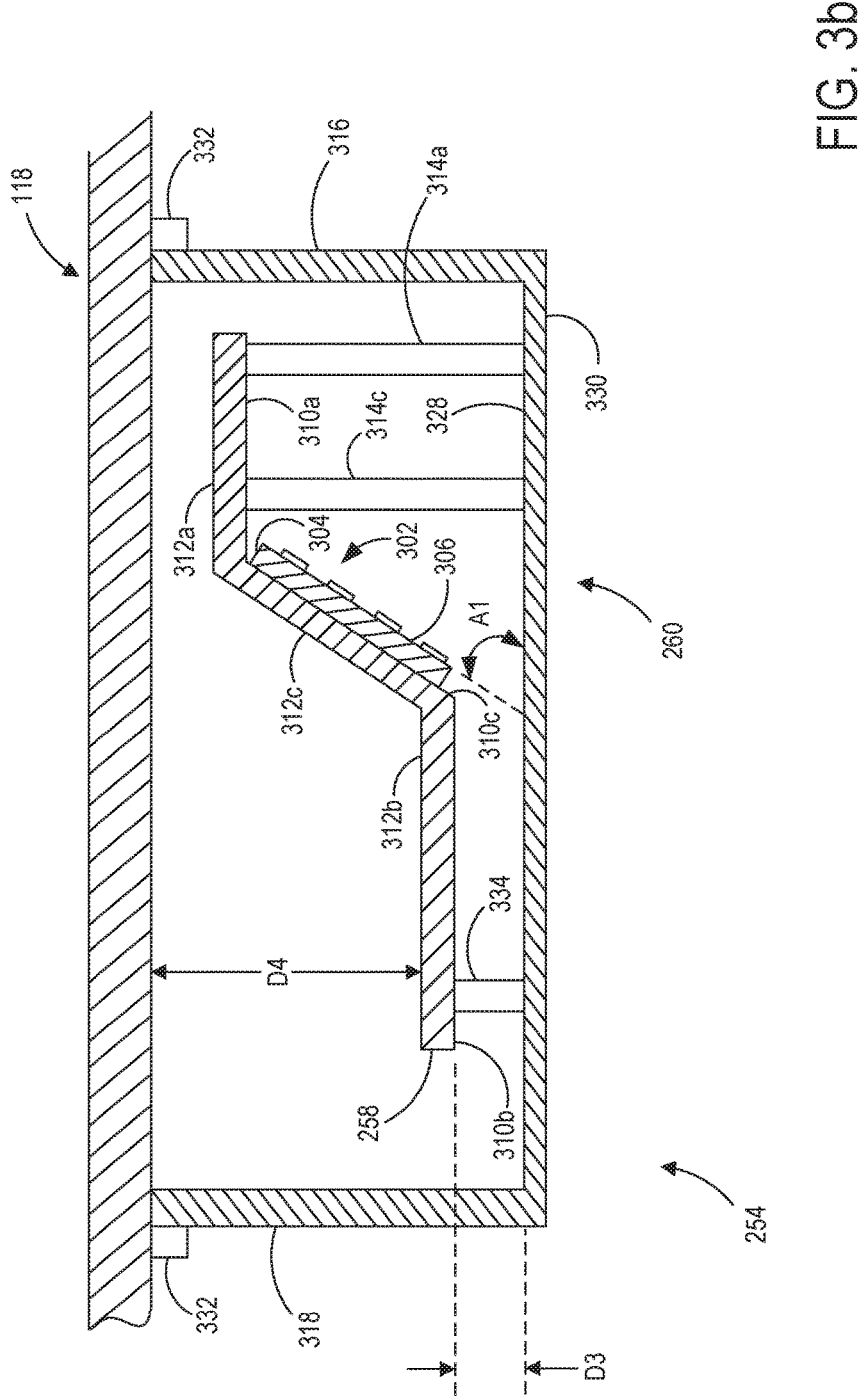
FIG. 3b is a cross-sectional view of an example light assembly associated with the enclosure of FIG. 2.
Figure 3C:
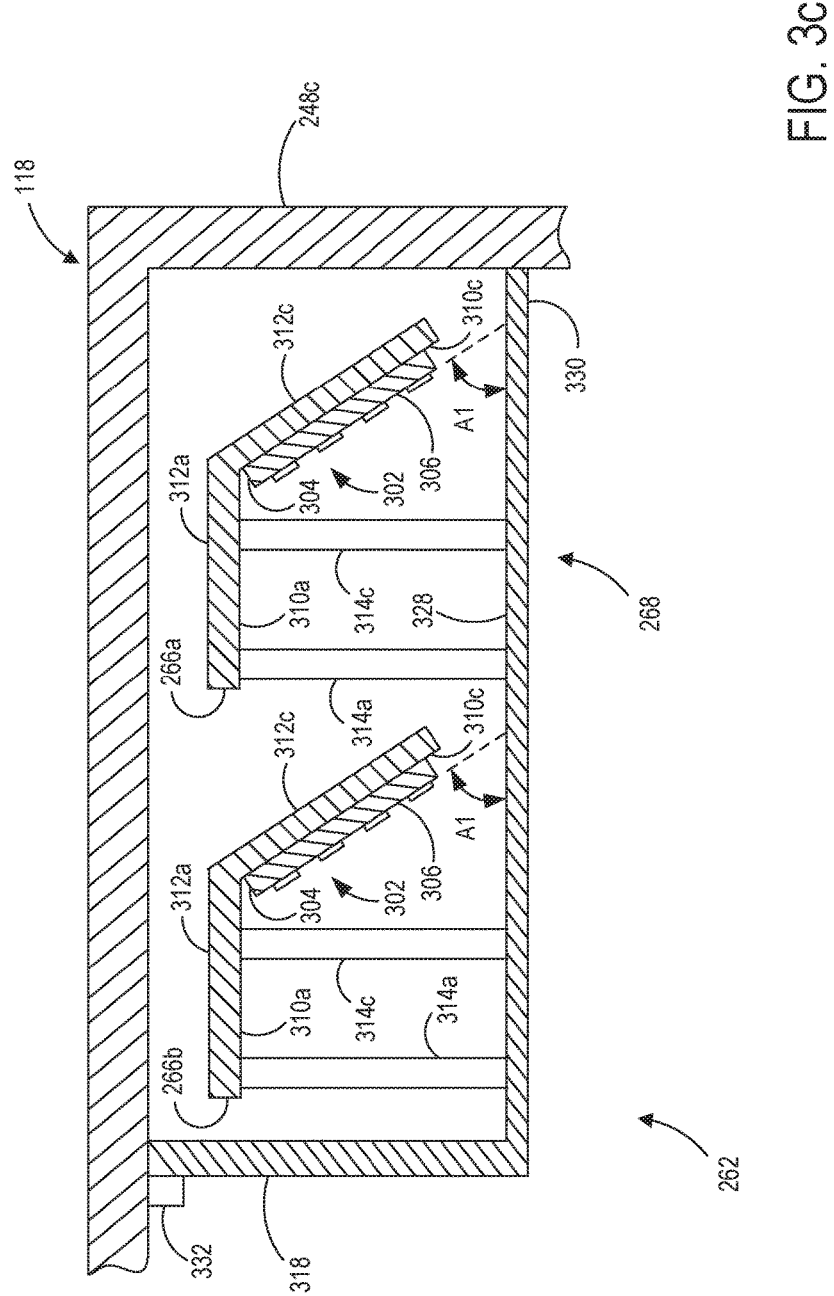
FIG. 3c is a cross-sectional view of an additional example light assembly associated with the enclosure of FIG. 2.

FIGS. 3a and 3b illustrate a first example light assembly 254 of the present disclosure, and FIG. 3c illustrates a second example light assembly 262. As noted above, the light assembly 262 may be substantially similar to and/or the same as the light assembly 254 and, in some embodiments, the light assembly 262 may include similar and/or substantially the same components as the light assembly 254. Accordingly, the descriptions of the light assembly 254 illustrated in FIGS. 3a and 3b, and of its components, may also be applicable to the light assembly 262 shown in FIG. 3c.

As shown in FIG. 3a, the light assembly 254 may include a light source 256, a heat sink 258, and a diffuser 260. The light source 256 may include one or more devices, or other such components configured to emit light and/or other radiation at any desired wavelength. For example, as illustrated in FIG. 3a, the light source 256 may include one or more LEDs 302a, 302b, 302c (collectively, "LEDs 302") disposed on, embedded at least partially within, and/or otherwise connected to a substrate 304. In some examples, the light source 256 may include an array of LEDs 302 disposed on the substrate 304, and such LEDs 302 may be positioned on the substrate 304 at various locations selected to maximize the amount of light directed to the interior space 122 by the light source 256. Additionally, although the light assembly 256 shown in FIG. 3a includes 32 LEDs 302, in additional examples, the light source 256 may include greater than or less than 32 LEDs 302.

The substrate 304 may comprise any substantially planar, substantially rigid structure configured to support one or more LEDs 302 or other such light-emitting components of the light assembly 254. For example, the substrate 304 may include a substantially planar top surface 306, and a substantially planar bottom surface 308 opposite and extending substantially parallel to the top surface 306. In some examples, the substrate 304 may comprise a printed circuit board or other like structure. In any of the examples described herein, the substrate 304 may comprise one or more terminals, leads, and/or other components (not shown) configured to provide an electrical connection between the power source 108 (FIG. 2) and the various LEDs 302 or other light-emitting components of the light source 256 disposed thereon.

In some examples, the LEDs 302 may be positioned at any desired location on, at least partially within, and/or along the top surface 306. For example, a first LED 302a may be spaced from a second adjacent LED 302b along and/or in the direction of the X-axis by a first distance D1. In some examples, the first distance D1 may be less than or equal to approximately 0.25 inches. In further examples, on the other hand, the first distance D1 may be greater than approximately 0.25 inches. For example, in further embodiments, the first distance D1 may be equal to at least approximately 0.625 inches, at least approximately 0.9375 inches, at least approximately 1.25 inches, at least approximately 1.625 inches, or any other desired value. Moreover, the first LED 302a may also be spaced from the third adjacent LED 302c along and/or in the direction of the Y-axis by a second distance D2. The second distance D2 may have any of the values described above with respect to the first distance D1. For example, the second distance D2 may be less than or equal to approximately 0.25 inches or, in other examples, the second distance D2 may be greater than approximately 0.25 inches. Although the light assembly 256 shown in FIG. 3a includes various LEDs 302 disposed along and/or substantially parallel to one or more axes (e.g., the X-axis and/or the Y-axis) defined by the top surface 306 of the substrate 304, in other examples the LEDs 302 may be disposed at any other location on, along, and/or relative to the top surface 306 in order to maximize the amount of light directed to the interior space 122 by the light source 256.

Although the light source 256 illustrated in FIG. 3a includes four rows of LEDs 302 spaced along the Y-axis by the second distance D2, in further embodiments the light source 256 may include a single row of LEDs 302 disposed along the Y-axis, and/or any number of rows of LEDs 302 greater than or less than four. Further, although the light source 256 illustrated in FIG. 3a includes eight columns of LEDs 302 spaced along the X-axis by the first distance D1, in further embodiments the light source 256 may include a single column of LEDs 302 disposed along the X-axis, and/or any number of columns of LEDs 302 greater than or less than eight. In some examples, the substrate 304 may include a single row or a single column of LEDs 302, and the light source 256 may include one or more such substrates 304. In such examples, individual substrates 304 of the light source 256 may be positioned at any desired location on or along the heat sink 258. For example, the individual substrates 304 of the light source 256 may be positioned at any desired location on or along a surface of the heat sink 258 so as to maximize, modify, affect, and/or otherwise control the amount of light directed into the interior space 122. For example, separate individual substrates 304 may be disposed at different angles relative to each other, relative to a surface of the diffuser 260, and/or relative to the internal space 122 so as to maximize, modify, affect, and/or otherwise control the amount of light directed into the interior space 122. In such examples, the heat sink 258 may include one or more angled surfaces, and one or more separate substrates 304 may be disposed on and/or along such angled surfaces so as to tailor the amount of light directed to the interior space 122.

As noted above, in example embodiments the substrate 304 may be disposed on, disposed along, and/or otherwise connected to the heat sink 258. For example, the heat sink 258 may comprise a substantially planar, substantially rigid structure configured to support one or more light sources 256 and to draw heat away from the relatively hot LEDs 302 and/or other light-emitting components of the light source 256 during use. Accordingly, in the examples described herein the LEDs 302, substrate 304, and/or other components of the light source 256 may be thermally connected to the heat sink 258. For example, the heat sink 258 may include one or more substantially planar top surfaces 310a, 310b, 310c (collectively, "top surfaces 310") and one or more corresponding substantially planar bottom surfaces 312a, 312b, 312c (collectively, "bottom surfaces 312") opposite and extending substantially parallel to the respective top surfaces 310a, 310b, 310c. As shown in FIGS. 3a and 3b, in some examples the top surface 310a may extend substantially parallel to the top surface 310b. Further, in such examples the top surface 310c may extend at an acute included angle, a right angle, or an obtuse included angle from at least one of the top surfaces 310a, 310b. Such configurations may be selected so as to maximize, modify, affect, and/or otherwise control the amount of light directed into the interior space 122.

In such examples, the bottom surface 308 of the substrate 304 may be disposed on, disposed along, and/or otherwise connected to at least one of the top surfaces 310 of the heat sink 258. In order to maximize heat transfer from the substrate 304 to the heat sink 258, in some examples of may be desirable to maximize the surface area of the bottom surface 308 that is thermally, mechanically, and/or otherwise connected to at least one of the top surfaces 310. For example, heat transfer from the substrate 304 to the heat sink 258 may be maximized by maximizing the surface area of the bottom surface 308 that is direct contact with at least one of the top surfaces 310, such as the top surface 310b and/or the top surface 310c. Further, heat sink 258 may be made from any metal (e.g., tin, aluminum, copper, etc.), alloy, and/or other thermally conductive material capable of passively drawing heat from the light source 256 and dissipating such heat along one or more surfaces of the heat sink 258. As illustrated in FIG. 3b, in one example embodiment at least one substrate 304 may be connected to the angled top surface 310c that is disposed between substantially parallel top surfaces 310a, 310b of the heat sink 258. Alternatively, in other example embodiments at least one substrate 304 may be connected to one of the top surfaces 310a, 310b.

Removing heat from the light source 256 using the heat sink 258 may enable, for example, the LEDs 302 and/or other light-emitting components of the light source 256 to operate at optimum levels. Removing heat from the light source 256 by way of the heat sink 258 may also assist in maintaining temperatures within the internal space 122, such as proximate the top 118 and/or proximate the light assembly 254, below approximately 75 degrees Celsius during use (at an ambient temperature of approximately 25 degrees Celsius). In some examples, the heat sink 258 may be configured to assist in maintaining temperatures proximate the light assembly 254 below approximately 65 degrees Celsius during use (at an ambient temperature of approximately 25 degrees Celsius).

Moreover, due to such improved heat dissipation, the LEDs 302 and/or other light-emitting components of the light source 256 may be driven at greater output levels, relative to existing light sources, without risking damage to the LEDs 302 or to the enclosure 102. Increasing the output level of the LEDs 302 in this way may, for example, increase the amount of light emitted by light assembly 254 within the interior space 122, thereby improving the illumination capabilities of the enclosure 102. Additionally, because the output level of the LEDs 302 may be increased due to the improved heat dissipation characteristics associated with use of the heat sink 258, fewer LEDs 302 may be required/needed to generate a desired amount of light within the interior space 122. Because fewer LEDs 302 may be used in the example embodiments described herein, the overall cost of the enclosure 102 may be reduced and system reliability may be improved.

The heat sink 258 may include one or more components configured to assist in connecting the heat sink 258 to the diffuser 260. For example, the heat sink 258 may include one or more spacers 314a, 314b, 314c, 314d (collectively, "spacers 314"). Such spacers 314 may comprise one or more clips, brackets, flanges, standoffs, and/or any other structures configured to connect the heat sink 258 with the diffuser 260, and in some examples, the diffuser 260 may include one or more such structures. Such spacers 314 may extend from at least one of the top surfaces 310, at least one of the bottom surfaces 312, and/or one or more sides of the heat sink 258 to facilitate connecting the heat sink 258 to the diffuser 260. Although the example light assembly 254 of FIG. 3a includes four spacers 314a, 314b, 314c, 314d, and each is disposed proximate a respective corner of the top surface 310a, in other examples more than or less than four spacers 314 may be used, and such spacers 314 may be disposed at any location on the top surface 310a, the top surface 310b, the bottom surface 312, and/or one or more sides of the heat sink 258.

Additionally, such spacers 314 may space the heat sink 258 and/or the substrate 304 from the diffuser 260 when the heat sink 258 is connected to the diffuser 260. For example, the diffuser 260 may include a first wall, 316, a second wall 318 disposed opposite and substantially parallel to the first wall 316, a third wall 320, and a fourth wall 322 disposed opposite and substantially parallel to the third wall 320. The diffuser 260 may also include a base 324. In some examples, at least one of the first, second, third, or fourth wall 316, 318, 320, 322 may extend substantially perpendicularly from the base 324. Additionally, in some embodiments, the diffuser 260 may form at least one cavity 326. In such embodiments, at least one of the first, second, third, or fourth wall 316, 318, 320, 322, or the base 324 may form at least a portion of the cavity 326. As shown in FIG. 3a, in some embodiments, the cavity 326 may be formed by at least part of the first, second, third, and fourth walls 316, 318, 320, 322 and a top surface 328 of the base 324. In some examples, the top surface 328 may comprise a substantially planar surface of the diffuser 260, and the base 324 may also include a substantially planar bottom surface 330 opposite and extending substantially parallel to the top surface 328. In such examples, the spacers 314 may space the heat sink 258, the light source 256, and/or the substrate 304 from the top surface 328 of the base 324 when the heat sink 258 is connected to the diffuser 260.

For example, during assembly of the light assembly 254, the substrate 304 may be connected to at least one of the top surfaces 310 of the heat sink 258, and the spacers 314 may be connected to the base 324, and/or one or more of the first, second, third, and fourth walls 316, 318, 320, 322. When connected in this way, the heat sink 258, the light source 256, and/or the substrate 304 may be disposed at least partially within the cavity 326, and the substrate 304 may be disposed between the heat sink 258 and the base 324 of the diffuser 260. At least one of the top surfaces 310 of the heat sink 258, and the top surface 306 of the substrate 304, may be disposed opposite and facing the top surface 328 of the base 324.

Additionally, the spacers 314 may space the top surfaces 310 of the heat sink 258 and the top surface 306 of the substrate 304 from the top surface 328 of the base 324 by any desired distance. For example, as shown in the example cross-sectional view of the light assembly 254 illustrated in FIG. 3b, the spacers 314 may space the top surface 310b of the heat sink 258 from the top surface 328 of the base 324 by a distance D3 greater than, less than, or substantially equal to 1 inch when the heat sink 258 is connected to the diffuser 260. Additionally or alternatively, the spacers 314 may space the surface 312b of the heat sink 258 from the top 118 by a distance D4 greater than, less than, or substantially equal to 1 inch when the heat sink 258 is connected to the diffuser 260. It is understood that in such embodiments, the spacing and/or angle A1 formed between, for example the at least one of the LEDs 302 connected to the substrate 304 and the top surface 328 of the base 324 may be selected to tune the diffusion effect of the diffuser 260 on the light and/or other radiation emitted by the LEDs 302. In some embodiments, such as embodiments in which the at least one of the LEDs 302 is disposed substantially coplanar with the top surface 306 of the substrate 304, such an angle A1 may be formed between the top surface 306 of the substrate 304 and the top surface 328 of the base 324. Additionally, such spacing and/or angular orientation may be selected in order to maximize diffusion of the light, and/or other radiation emitted by the LEDs 302 by the diffuser 260. For example, while the embodiment of FIG. 3b illustrates the substrate 304 and the LEDs 302 being disposed at an acute angle A1 relative to the top surface 328 of the base 324, in other examples, the substrate 304 and the LEDs 302 may be disposed substantially parallel to and/or at any other angle relative to the top surface 328 in order to maximize or otherwise tune the diffusion of the light and/or other radiation emitted by the LEDs 302 by the diffuser 260. For example, as noted above, in other embodiments a substrate 304 and the LEDs 302 may be disposed on the surface 310b of the heat sink 258. In such embodiments, the substrate 304 and the LEDs 302 may be disposed substantially parallel to the top surface 328.

The diffuser 260 may be configured to facilitate the passage of light and/or other radiation emitted by the LEDs and/or other light-emitting components of the light source 256 from the light source 256 into the interior space 122. In some examples, the diffuser 260 may also be configured to collimate, diffuse, reflect, refract, filter, focus, and/or otherwise condition light and/or other radiation impinging thereon. Accordingly, in some examples, the diffuser 260 may comprise one or more layers of semi-transparent diffusive material configured to disperse light emitted by the LEDs 302 within the interior space 122. The diffuser 260 may be made from any of the materials described above with respect to the outer layer 202 and/or the intermediate layer 204 to facilitate such functionality. Additionally or alternatively, the diffuser 260 may be made from a substantially heat resistant polymer, synthetic material, or other such material configured to diffuse and/or reflect light and to support the heat sink 258, the substrate 304, and/or other components of the light assembly 254.

The diffuser 260 may also substantially surround at least part of the heat sink 258 and/or the substrate 304 when the light assembly 254 is installed in the enclosure 102. For example, the diffuser 260 may be connected to the top 118 of the enclosure via one or more brackets, clips, spacers, stand-offs, flanges, and/or other connectors 332 of the diffuser 260 and/or the top 118. The heat sink 258 may be disposed between the substrate 304 and the top 118, and the bottom surface 312b of the heat sink 248 may be spaced from the top 118 by the distance D4 so as to substantially thermally isolate the substrate 304 and the relatively hot LEDs 302 from the top 118. In such examples, the bottom surface 312b may be disposed opposite and facing the top 118. The heat sink 258 and/or the diffuser 260 may also include one or more additional spacers 334, similar to the spacers 314, to assist in spacing the top surface 310b of the heat sink 258 from the top surface 328. Additionally, one or more of the first, second, third, or fourth walls 316, 318, 320, 322 may mate with, contact, and/or be disposed substantially adjacent to the inner layer 274 of the top 118 so as to prohibit access to the LEDs 302 from the interior space 122 during use. It is understood that in examples in which the diffuser 260 is mounted substantially adjacent to one or more of the legs 248 of the top 118, at least one of the first, second, third, or fourth walls 316, 318, 320, 322 disposed substantially adjacent to a respective one of the legs 248 may be omitted. The diffuser 260 may also be substantially rigid so as to shield a user from the relatively hot LEDs 302 during operation. Further, shielding the user from the LEDs 302 in this way may protect the LEDs 302 from damage caused by electrostatic discharge or other adverse ramifications resulting from contact between the user and the LEDs 302.

FIG. 3c illustrates a cross-sectional view of the second light assembly 262 disposed substantially adjacent to the frontmost leg 248c. As noted above, various components of the first light assembly 254 described with respect to FIGS. 3a and 3b may be substantially similar to and/or the same as the second light assembly 262. Accordingly, like item numbers may be used to describe like components of the second light assembly 262.

The light assembly 262 may include at least one heat sink and at least one corresponding light source. For example, as shown in FIG. 3c, the light assembly 262 may include a first heat sink 266a and a second heat sink 266b that is substantially similar to and/or the same as the first heat sink 266a. In some examples, at least one of the heat sinks 266a, 266b may be substantially similar to and/or the same as the heat sink 258 described above with respect to FIG. 3b. Alternatively, at least one of the heat sinks 266a, 266b may include one or more substantially planar top surfaces 310a, 310c and one or more corresponding substantially planar bottom surfaces 312a, 312c opposite and extending substantially parallel to the respective top surfaces 310a, 310c. In such examples, the portions of the heat sink 258 described above forming the top surfaces 310b, 312b may be omitted. As shown in FIG. 3c, the top surface 310c and/or the top surface 306 of the substrate 304 may extend at an acute angle A1, a right angle, or an obtuse included angle from the top surface 328 of the base 324. Such configurations may be selected so as to maximize, modify, affect, and/or otherwise control the amount of light directed into the interior space 122. In such examples, the bottom surface 308 of the respective substrates 304 may be disposed on, disposed along, and/or otherwise connected to the top surface 310c of the respective heat sinks 266a, 266b.

Additionally, in some examples one or more components of the diffuser 268 may be omitted. For instance, in examples in which the light assembly 262 is disposed proximate and/or substantially adjacent to one or more legs 248 of the top 118, a corresponding wall 316, 318, 320, 322 of the diffuser 268 may be omitted. As shown in FIG. 3c, in examples in which the light assembly 262 is disposed substantially adjacent to the frontmost leg 248c, the wall 316 of the diffuser 268 may be omitted.

FIGS. 4a-4c illustrate an example hinge feature 270 of the present disclosure. As noted above, the enclosure 102 may include one or more hinge features 270, 272 connecting the top 118 to the back wall 116. In such examples, the hinge feature 270 may be substantially similar to and/or the same as the feature 272 and, in some embodiments, the hinge feature 270 may include similar and/or substantially the same components as the hinge feature 272. Accordingly, the description of the hinge feature 270 illustrated in FIGS. 4a-4c may also be applicable to the hinge feature 272.

As shown in FIG. 4a, an example hinge feature 270 of the present disclosure may include a housing 402 having a top leg 404 and a bottom leg 406. The hinge feature 270 may also include a hinge 408 pivotally, rotatably, hingedly, and/or otherwise movably connecting the top leg 404 to the bottom leg 406. Alternatively, it is understood that in additional example embodiments, one or both of the top and bottom legs 404, 406 could be omitted. In such examples, the hinge feature 270 may include a hinge 408 connected to the top 118 and the back wall 116 so as to rotatably connect the top 118 to the back wall 116.

With continued reference to the example configuration illustrated in FIG. 4a, in an embodiment in which a hinge feature 270 includes a top leg 404 and a bottom leg 406, the top and bottom legs 404, 406 may be substantially rigid extensions, and/or other structures of the housing 402 configured to mate with the top 118 and the back wall 116, respectively. In such examples, the top leg 404 may comprise one or more brackets, flanges, tabs, and/or other structures configured to facilitate a mechanical connection between the top leg 404 and at least a portion of the top 118. Similarly, the bottom line 406 may comprise one or more brackets, flanges, tabs, and/or other structures configured to facilitate a mechanical connection between the bottom leg 406 and the back wall 116. In such examples, the top leg 404, bottom leg 406, hinge 408, and/or other components of the hinge feature 270 may be made from any metal, alloy, polymer, and/or other substantially rigid material to facilitate such a connection. In some examples, the top leg 404 may be disposed in a position substantially perpendicular to the bottom leg 406 when the enclosure 102 is in the expanded state, and the top leg 404 may be disposed in a position substantially parallel to and adjacent the bottom leg 406 when the enclosure 102 is in the collapsed state.

For example, FIG. 4b illustrates a configuration of the hinge feature 270 corresponding to the expanded state of the enclosure 102 in which the bottom leg 406 has been rotated in the direction of arrow 410 to a position substantially perpendicular to the top leg 404. FIG. 4c, on the other hand, illustrates a configuration of the hinge feature 270 corresponding to the collapsed state of the enclosure 102 in which the bottom leg 406 has been rotated in the direction of arrow 412 to a position substantially perpendicular to the top leg 404. As noted above, in additional example embodiments, one or both of the top and bottom legs 404, 406 could be omitted. In such embodiments, the dotted lines illustrating the top leg 404 in the example configuration of FIGS. 4b and 4c may comprise at least a portion of the top118, and the dotted lines illustrating the bottom leg 406 in the example configuration of FIGS. 4b and 4c may comprise at least a portion of the back wall 116. In such examples, the hinge 408 may be connected to the top 118 and the back wall 116 so as to rotatably connect the top 118 and the back wall 116.

Moreover, the positions illustrated in FIGS. 4b and 4c are exemplary and, in further embodiments, the top leg 404 may be disposed in any position relative to the bottom leg 406 in the collapsed and expanded states of the enclosure 102.

Further, it is understood that one or more surfaces, structures, and/or other configurations of the top and bottom legs 404, 406 may limit rotation of, for example, the bottom leg 406 relative to the top leg 404 during the transition of the enclosure 102 from the collapsed state to the expanded state. Additionally or alternatively, in example embodiments in which one or both of the top and bottom legs 404, 406 have been omitted, one or more surfaces or structures of the top 118 and of the back wall 116 may mate to limit rotation of the top 118 relative to the back wall 116 during the transition of the enclosure 102 from the collapsed state to the expanded state.

For example, as shown in FIG. 4b, a surface of the bottom leg 406 may contact and/or otherwise mate with a corresponding surface of the top leg 404 in a configuration of the hinge feature 270 corresponding to the expanded state of the enclosure 102. Additionally, as shown in FIG. 4c, another surface of the bottom leg 406 may contact and/or otherwise mate with a corresponding surface of the top leg 404 in a configuration of the hinge feature 270 corresponding to the collapsed state of the enclosure 102. In this way, the various mating surfaces of the bottom leg 406 and the top leg 404 may limit rotation of, for example, the bottom leg 406 relative to the top leg 404. Alternatively, as noted above, the mating surfaces of the top and bottom legs 404, 406 illustrated in FIGS. 4b and 4c may comprise mating surfaces of the top 118 and of the back wall 116, respectively.

As previously noted, the enclosure 102 may include one or more switches configured to connect the light assemblies 254, 262 to the power source 108 when the switch is in a closed configuration, and to disconnect the light assemblies 254, 262 from the power source 108 when the switch is in an open configuration. In some examples, such a switch 414 may be connected to and/or may otherwise comprise an integral component of the top 118. For example, the switch 414 may be connected to the top 118, and may be acted on by one or more components of the enclosure 102 moving relative to the top 118 and/or relative to the switch 414 during use of the enclosure 102. For example, the switch 414 may have a normally open configuration (i.e., forming an open circuit) and, when acted on by, for example, the back wall 116 and/or a component thereof, the switch 414 may transition from the normally open configuration to a closed configuration (i.e., forming a closed circuit). In additional examples, such a switch 414 may be included in the hinge feature 270. In some examples, each of the hinge features 270, 272 may include a respective switch 414.

In some examples described herein, each respective switch 414 of the enclosure 102 may be operably connected to at least one respective light assembly of the enclosure 102. In other examples, at least one switch 414 of the enclosure 102 may be operably connected to one or more of the light assemblies included in the enclosure 102. An example switch 414 may comprise any limit switch, proximity switch, on-off switch, and/or other electrical, optical, mechanical, and/or other device configured to permit the flow of electricity therethrough in a closed position, and to prohibit the flow of electricity therethrough in an open position. The switch 414 may include any number of components configured to facilitate the flow of electricity from the power source 108 to one or more of the light assemblies 254, 262 while the switch 414 is in the closed position. For example, as most clearly seen in FIG. 4c, the switch 114 may include a terminal 416a configured to accept a cam, a plunger, an electrically conductive linkage, and/or other component 416b connected to and movable with the bottom leg 406. In such examples, the component 416b may be disposed on a surface of the bottom leg 406 (or alternatively, on a corresponding surface of the back wall 116 in examples in which the bottom leg 406 has been omitted), and the terminal 416a may be disposed on and/or embedded substantially within a corresponding surface of the top leg 404 (or alternatively, on a corresponding surface of the top 118 in examples in which the top leg 404 has been omitted). In such examples, transitioning the enclosure 102 to the expanded state may cause the component 416b to act on the terminal 416a of the switch 414, thereby closing an electrical path 418 (FIG. 4d) between the power source 108 and at least one of the light assemblies 254, 262 connected to the switch 414. In particular, transitioning the enclosure 102 to the expanded state may transition the normally open switch 414 to a closed configuration, and may close and/or otherwise form the electrical path 418 between the power source 108 and at least one of the light assemblies 254, 262. An example circuit diagram illustrating such an electrical path 418 is illustrated in FIG. 4d. Additionally, transitioning the enclosure 102 to the collapsed state corresponding to the configuration illustrated in FIG. 4c may open the electrical path 418 between the power source 108 and at least one of the light assemblies 254, 262. In particular, transitioning the enclosure 102 to the collapsed state may transition the switch 414 to an open position, and may open and/or otherwise interrupt the electrical path 418 between the power source 118 and at least one of the light assemblies 254, 262.

FIG. 5 illustrates an example embodiment 500 of the enclosure 102 in the expanded state. For example, during use the top 118 may be moved in the direction of arrow 126 away from the base 110. As the top 118 is moved in the direction of arrow 126, the first and second sidewalls 112, 114 may pivot into the respective positions shown in FIG. 5 such that the first and second sidewalls 112, 114 extend substantially perpendicularly from the top 118 and the base 110. Additionally, the back wall 116 may extend substantially perpendicularly from the top 118 and the base 110 when the enclosure 102 is in the expanded state. To maintain the enclosure 102 in the expanded state, the respective tension mechanisms 216 of the sidewalls 112, 114 may be engaged, thereby prohibiting bending, folding, and/or other movement of the sidewalls 112, 114. Additionally, the layer 284 may be positioned so as to overlay at least a portion of the surface 224 of the back wall 116 and/or at least a portion of the surface 240 of the inner layer 238. For example, the layer 284 may be sized and/or otherwise configured to extend from the top 118 and to overlay substantially the entire back wall 116 and substantially the entire surface 240 of the inner layer 238.

A user of the enclosure 102 may additionally rotate, fold, and/or otherwise move the front wall 120 in the direction of arrow 410 in order to expose the interior space 122 of the enclosure 120. With at least a portion of the interior space 122 exposed, the user may dispose one or more items 502 within the interior space 122. For example, the user may dispose an item 502 on the surface 240 of the base 110. Alternatively, in examples in which the layer 284 overlays at least a portion of the surface 240, the user may dispose the item 502 on at least part of the surface 288 of the layer 284. With the item 502 positioned as desired, the user may rotate, fold, and/or otherwise move the front wall 120 in the direction of arrow 412 in order to substantially close the enclosure 102. Once configured in this way, the user may capture one or more images of the item 502, via one or more of the passages 136, 132 of the enclosure 102, using the imaging device 104.

Figure 6:
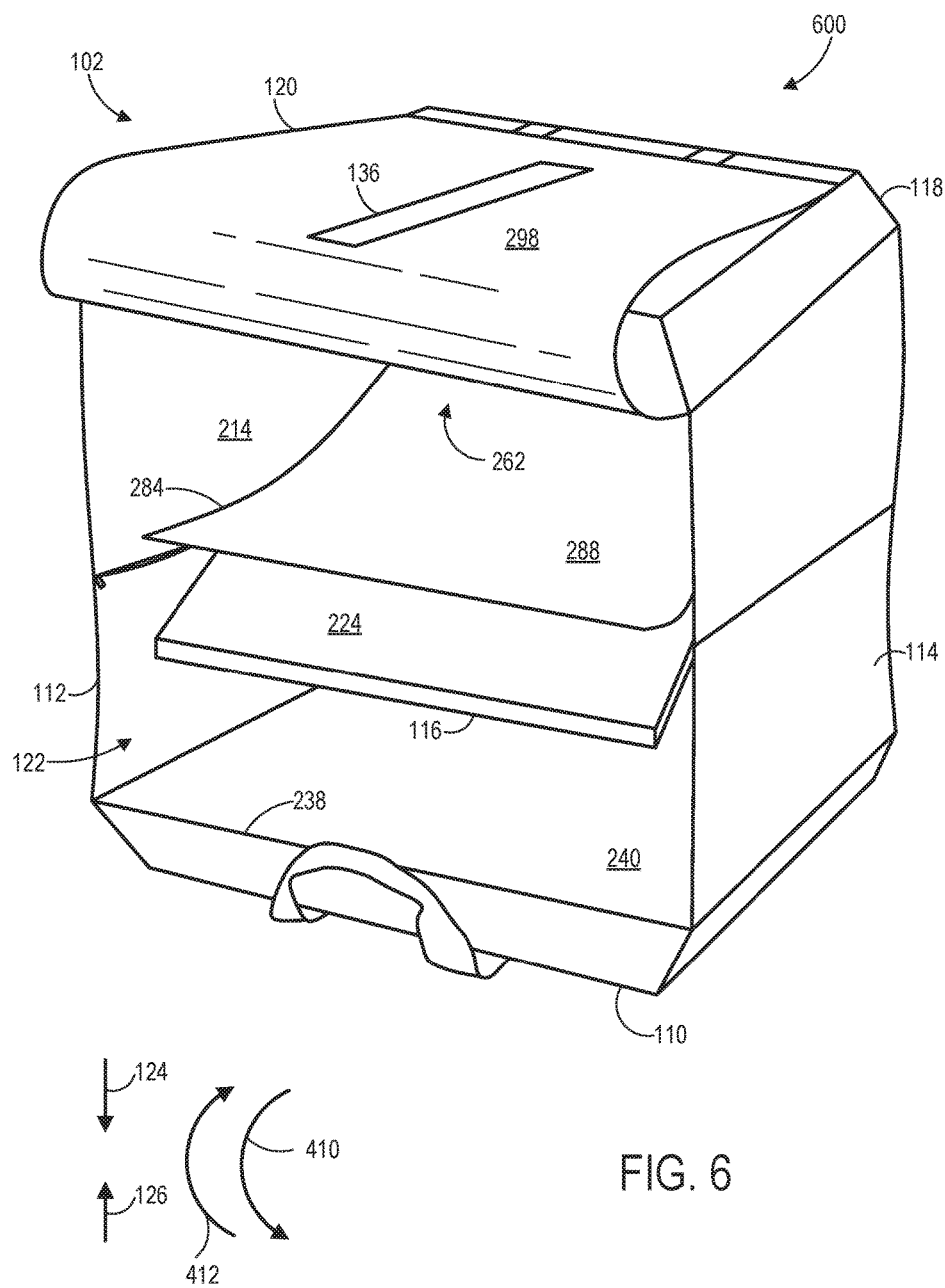
FIG. 6 illustrates the enclosure of FIG. 2 while in transition between the expanded state and a collapsed state.

FIG. 6 illustrates an example embodiment 600 of the present disclosure in which the enclosure 102 is in transition between the expanded state and the collapsed state. For example, in order to transition the enclosure 102 from the expanded state shown in FIG. 5 to an example collapsed state, a user may rotate, pivot, and/or otherwise move both the layer 284 and the back wall 116 in the direction of arrow 410. In this way, the user may move the layer 284 and the back wall 116 away from the base 110 and toward the top 118. Once the back wall 116 is positioned proximate and/or substantially adjacent to the surface 276 of the inner layer 274 (FIG. 2), the user may disengage the tension mechanisms 216 to facilitate bending, folding, and/or other movement of the sidewalls 112, 114. The user may also move the base 110 and/or the top 118 as desired to transition the enclosure to the collapsed state.

Figure 7:
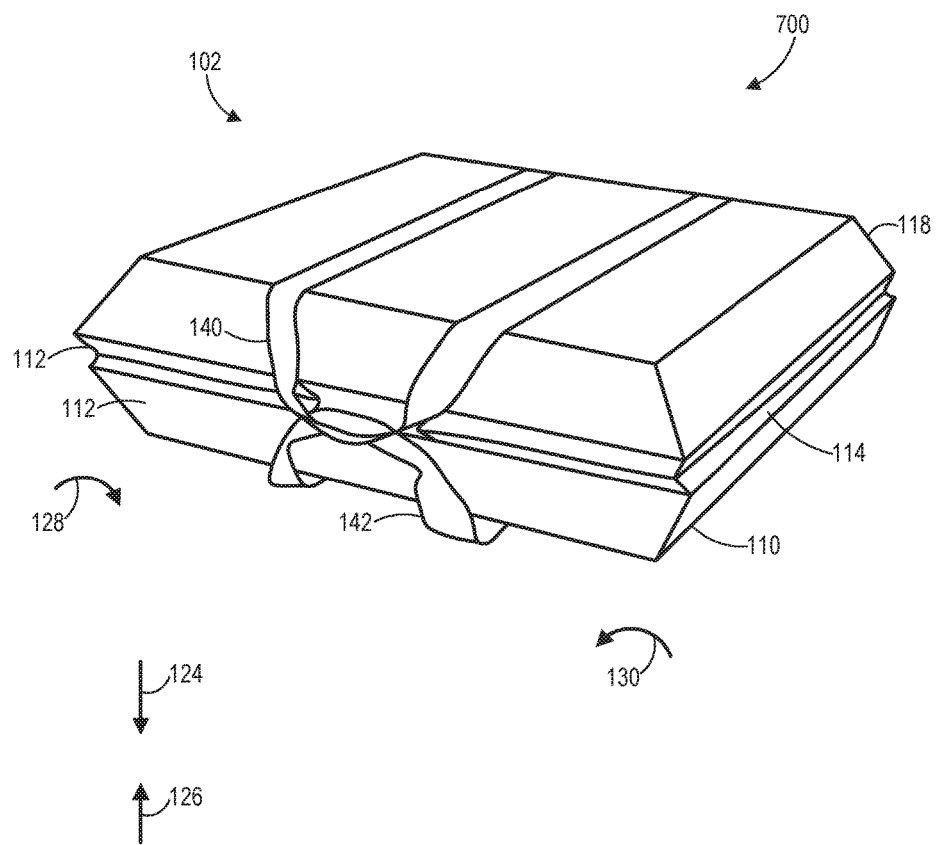
FIG. 7 illustrates the enclosure of FIG. 2 in the collapsed state.
Figure 8:
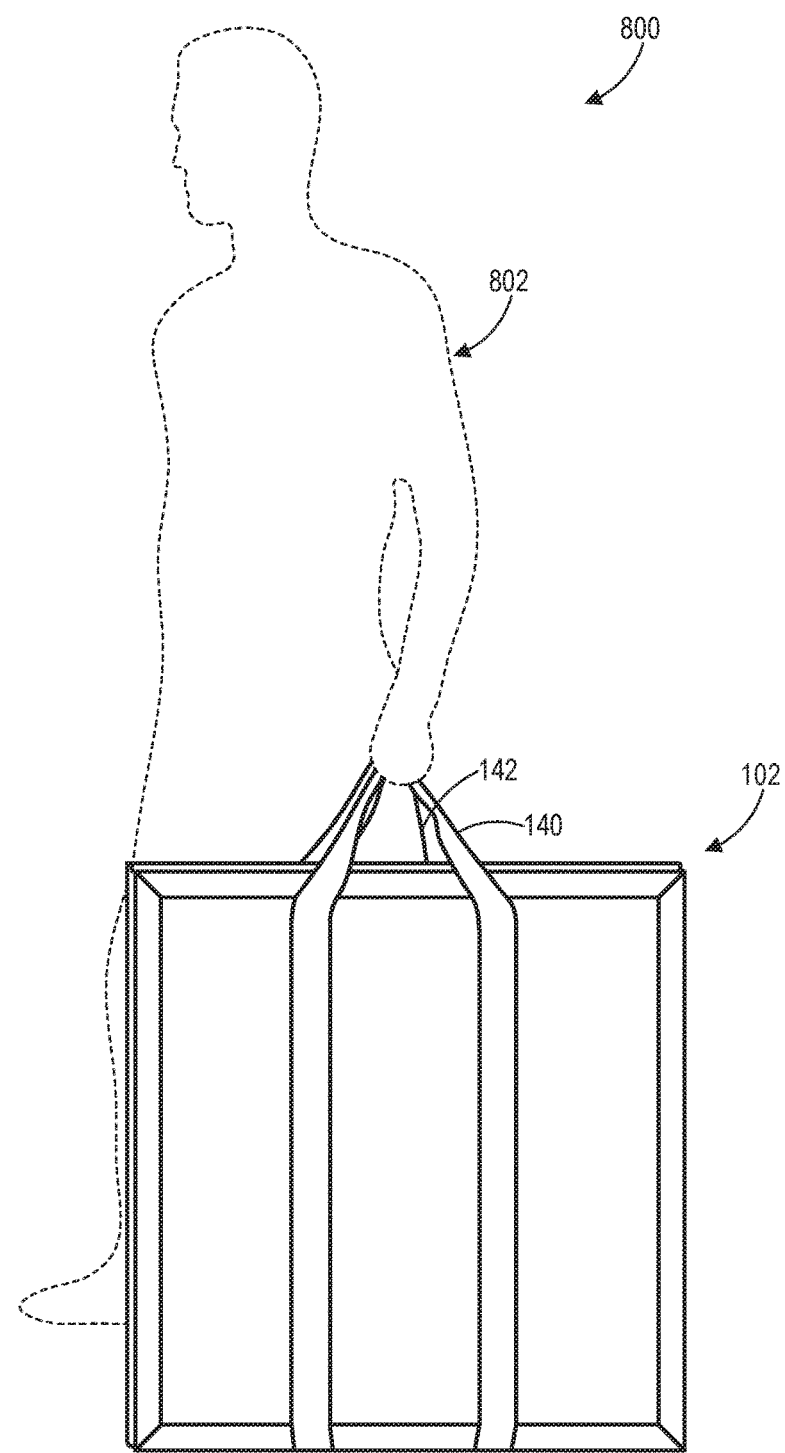
FIG. 8 illustrates another view of the enclosure of FIG. 2 in the collapsed state.

FIG. 7 illustrates a further example embodiment 700 of the present disclosure in which the enclosure 102 has been transitioned to the collapsed state. As described above, in order to transition the enclosure 102 to the collapsed state the top 118 may be moved toward the base 110 in the direction of arrow or 124 and/or the base 110 may be moved toward the top 118 in the direction of arrow 126. In such a collapsed state, the first and second sidewalls 112, 114 may be folded, bent, and/or otherwise moved in a direction toward the interior space 122. For example, the first sidewall 112 may bend, pivot, and/or otherwise fold along the seam 206 of the intermediate layer 204 in the direction of arrow 128 as the enclosure 102 is transitioned to the collapsed state. Similarly, the second sidewall 114 may bend, pivot, and/or otherwise fold along the respective seam 206 of the intermediate layer 204 in the direction of arrow 130 as the enclosure 102 is transitioned to the collapsed state. Additionally, the first and second panels 208, 210 of the first and second sidewalls 112, 114, respectively, may extend substantially parallel to the base 110 and/or the top 118 when the enclosure 102 is in the collapsed state. Once in the collapsed state, the user may engage one or more straps, buckles, brackets, ties, latches, and/or other retention components of the enclosure 102 (not shown) configured to maintain the enclosure 102 in the collapsed state and to otherwise prohibit enclosure 102 from transitioning to the expanded state.

Once in the collapsed state, the enclosure 102 may be easily stored and/or transported by the user. For example, as shown in the example embodiment 800 of FIG. 8 a user 802 may transport the enclosure 102 by grasping the handles 140, 142 thereof and lifting the enclosure 102 substantially vertically. Once the user 802 has transported the enclosure 102 to a new desired location, the user 802 may transition the enclosure 102 from the collapsed state to the expanded state as described above.

As noted above, example embodiments of the present disclosure provide a photo enclosure that is relatively lightweight, and that is easily collapsible and expandable. The enclosure defines an interior space that is shaped, sized, and/or otherwise configured to accept one or more items to be photographed therein. For example, the enclosure includes one or more light assemblies configured to illuminate the interior space while an image of the item is being captured. Such light assemblies may be disposed on and/or otherwise connected to at least one of the base or the top of the enclosure. Such light assemblies may include a plurality of light sources disposed on a substrate, and the substrate may be thermally and/or otherwise connected to a heat sink. The light assemblies may also include a diffuser connected to the base or the top, and the heat sink may be connected to the diffuser. The enclosure may also include one or more on/off switches configured to connect the light assemblies with a power source when the enclosure is in the expanded state, and to disconnect the light assemblies from the power source when the enclosure is in the collapsed state. Further, one or more components of the enclosure may include a layer of semi-transparent diffusive material. Such layers of diffusive material may be, for example, off-white, pure white, or any other color configured to improve the overall quality of the captured image.

In particular, due to the above configurations of the example enclosures described herein the resulting images of the item captured by the imaging device 104 may be substantially free from shadows. Additionally or alternatively, the example enclosures of the present disclosure may reduce and/or substantially eliminate specular reflection of radiation emitted by the light assemblies and directed to the interior space 122. Such images of the item may also have a sharpness, brightness, clarity, resolution, contrast, and/or other optical characteristics sufficient to satisfy the stringent image quality requirements of known online retailers and/or other websites to which the resulting image may be transferred and/or uploaded.

In addition, due to the heat dissipation provided by the example heat sinks described herein, the risk of damage to the light sources and other components of the enclosure 102 may be reduced. Due to such improved heat dissipation, the light sources included in the respective light assemblies may be driven at relatively high output levels, relative to existing light assemblies, without risking damage to the components of the enclosure 102. Increasing the output level of the respective light sources in this way may, for example, increase the amount of light emitted by the light assemblies within the interior space, thereby improving the illumination capabilities of the enclosure 102. Additionally, because the output level of the light sources may be increased due to the improved heat dissipation characteristics associated with example light assemblies of the present disclosure, such light assemblies may include fewer light sources relative to existing light assemblies, thereby reducing the overall cost of the enclosure 102 and improving system reliability.

Example enclosures 102 of the present disclosure may also include one or more on/off switches connected to the respective light assemblies. In some embodiments, such switches may be a component of, for example, one or more hinge assemblies of the present disclosure configured to assist in transitioning the enclosure between the expanded state and the collapsed state. Such switches may assist in further improving the safety and reliability of the example photo enclosures described herein.

Accordingly, the example systems and methods of the present disclosure offer unique and heretofore unworkable approaches to digital imaging. Such systems and methods simplify the process of obtaining high quality images and, thus, improve user satisfaction.

CONCLUSION

Although the techniques have been described in language specific to structural features and/or methodological acts, it is to be understood that the appended claims are not necessarily limited to the features or acts described. Rather, the features and acts are described as example implementations of such techniques.

Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

The invention claimed is:

1. A collapsible photo enclosure, comprising:
a base;
a first sidewall extending from the base;
a second sidewall extending from the base and positionable opposite the first sidewall;
a top disposed opposite the base, the top being moveable toward the base to transition the photo enclosure from an expanded state to a collapsed state;
a back wall positionable between the first sidewall and the second sidewall, and connected to one of the top or the base; and
a light assembly including a diffuser, a heat sink connected to the diffuser, a substrate connected to the heat sink, and a light source connected to the substrate, wherein:
the diffuser is connected to one of the top or the base such that the heat sink is spaced from the one of the top or the base,
the top, the back wall, the first and second sidewalls, and the base define at least part of an interior space of the photo enclosure, and
at least one of the first sidewall, the second sidewall, or the back wall is foldable in a direction toward the interior space as the photo enclosure is transitioned from the expanded state to the collapsed state.

2. The collapsible photo enclosure of claim 1, wherein:
the light source comprises a light-emitting diode;
the substrate comprises a printed circuit board; and
the light-emitting diode is disposed on the printed circuit board.

3. The collapsible photo enclosure of claim 1, wherein:
the substrate is disposed on a first surface of the heat sink;
at least one of the heat sink or the diffuser includes a spacer; and
the spacer spaces the first surface of the heat sink from a second surface of the diffuser opposite the first surface.

4. The collapsible photo enclosure of claim 1, further comprising a switch connected to the top, wherein:
the switch forms at least part of an electrical path between a power source and the light assembly;
transitioning the photo enclosure to the expanded state closes the electrical path; and
transitioning the photo enclosure to the collapsed state opens the electrical path.

5. An enclosure, comprising:
a base;
a top disposed opposite the base, the top being moveable toward the base to transition the enclosure from an expanded state to a collapsed state;
a plurality of walls, each wall of the plurality of walls being connected to at least one of the top or the base; and
a light assembly configured to illuminate an interior space of the enclosure at least partly defined by the base and the plurality of walls, wherein:
the light assembly includes a diffuser, a heat sink connected to the diffuser, a substrate connected to the heat sink, and a light source connected to the substrate and disposed at least partially within a cavity of the diffuser, and at least part of at least one wall of the plurality of walls extends substantially parallel to the base when the enclosure is in the collapsed state.

6. The collapsible photo enclosure of claim 5, wherein:
a third surface of the substrate is disposed on the first surface of the heat sink; and
a fourth surface of the substrate, opposite the third surface, faces the second surface of the diffuser and is spaced from the second surface by the spacer.

7. The enclosure of claim 5, wherein:
the diffuser comprises a first wall, a second wall opposite the first wall, a third wall, a fourth wall opposite the third wall, and a base substantially perpendicular to the first, second, third, and fourth walls.

8. The enclosure of claim 7, wherein:
the base of the diffuser, and the first, second, third, and fourth walls form the cavity; and
the substrate is disposed at least partially within the cavity.

9. The enclosure of claim 5, wherein the diffuser is connected to the top, and the heat sink is disposed between the substrate and the top.

10. The enclosure of claim 5, wherein the heat sink is disposed at least partially within the cavity, and the substrate is disposed between the heat sink and a base of the diffuser.

11. The enclosure of claim 5, wherein:
the substrate is disposed on a first surface of the heat sink,
a second surface of the heat sink, opposite the first surface, faces and is spaced from the top, and
the first surface of the heat sink faces and is spaced from a third surface of the diffuser by a spacer, the third surface forming at least part of the cavity.

12. The enclosure of claim 5, further comprising an additional light assembly connected to one of the top or the base, the additional light assembly being configured to illuminate the interior space.

13. The enclosure of claim 5, further comprising a switch operably connected to the light assembly, wherein:
transitioning the photo enclosure to the expanded state closes an electrical path between a power source and the light assembly; and
transitioning the photo enclosure to the collapsed state opens the electrical path.

14. The enclosure of claim 13, wherein the switch is connected to the top, and a component configured to act on the switch, so as to close or open the electrical path, is connected to a wall of the plurality of walls.

15. The enclosure of claim 5, further comprising a layer of semi-transparent diffusive material movably disposed within the interior space and configured to overlay at least a portion of the base.

16. The enclosure of claim 5, wherein the diffuser comprises a semi-transparent diffusive material configured to disperse light emitted by the light source within the interior space.

17. The enclosure of claim 5, wherein the light assembly comprises at least one light emitting diode and is characterized by an output of greater than approximately 500 lumens per square foot.

18. A light assembly, comprising:
a diffuser comprising a plurality of walls and a base disposed substantially perpendicular to each wall of the plurality of walls, the base and the plurality of walls forming a cavity of the diffuser;
a heat sink having a first surface and a second surface opposite the first surface, the first surface of the heat sink facing a third surface of the base, the third surface forming at least part of the cavity;
a spacer spacing the first surface from the third surface;
a substrate having a fourth surface and a fifth surface opposite the fourth surface, the fourth surface being disposed on the first surface of the heat sink, and the fifth surface facing and being spaced from the third surface of the base; and
a light source connected to the substrate, the diffuser being configured to pass light, emitted by the light source, through the plurality of walls and the base.

19. The light assembly of claim 18, wherein the spacer substantially thermally isolates the first surface of the heat sink from the third surface of the base.

20. The light assembly of claim 18, wherein:
the substrate comprises a printed circuit board, and
the heat sink and the printed circuit board are disposed at least partially within the cavity.

* * * * *